(12) United States Patent
Gschwind et al.

(10) Patent No.: US 10,884,931 B2
(45) Date of Patent: *Jan. 5, 2021

(54) INTERPROCESSOR MEMORY STATUS COMMUNICATION

(71) Applicant: International Business Machines Corporation, Armonk, NY (US)

(72) Inventors: Michael Karl Gschwind, Chappaqua, NY (US); Maged M. Michael, Danbury, CT (US); Valentina Salapura, Chappaqua, NY (US); Eric M. Schwarz, Gardiner, NY (US); Chung-Lung K. Shum, Wappingers Falls, NY (US); Timothy J. Slegel, Staatsburg, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/379,899

(22) Filed: Apr. 10, 2019

(65) Prior Publication Data

US 2019/0236012 A1 Aug. 1, 2019

Related U.S. Application Data

(63) Continuation of application No. 15/292,946, filed on Oct. 13, 2016, now Pat. No. 10,346,305, which is a
(Continued)

(51) Int. Cl.
*G06F 9/46* (2006.01)
*G06F 12/0817* (2016.01)
(Continued)

(52) U.S. Cl.
CPC .......... *G06F 12/0828* (2013.01); *G06F 9/467* (2013.01); *G06F 12/084* (2013.01);
(Continued)

(58) Field of Classification Search
None
See application file for complete search history.

(56) References Cited

U.S. PATENT DOCUMENTS 4,928,225 A 5/1990 McCarthy et al.
5,630,095 A 5/1997 Snyder
(Continued)

OTHER PUBLICATIONS

Jacobi et al., "Transactional Memory Architecture and Implementation for IBM System z", Proceedings 2012 IEEE/ACM 45th International Symposium on Microarchitecture MICRO-45, presented Dec. 1-5, 2012, pp. 25-36, Copyright © 2012 by The Institute of Electrical and Electronics Engineers, Inc.
(Continued)

*Primary Examiner* — Shih-Wei Kraft
(74) *Attorney, Agent, or Firm* — Stosch Sabo

(57) ABSTRACT

In a transactional memory environment including a first processor and one or more additional processors, a computer-implemented method includes identifying a memory location and sending a probe request from the first processor to the additional processors. The probe request includes the memory location. The computer implemented method further includes generating, by each additional processor, an indication including whether the memory location is in use for a transaction by the additional processor. The computer-implemented method further includes sending the indication from each additional processor to the first processor and proceeding, by the first processor, based on the indication.

19 Claims, 16 Drawing Sheets

Related U.S. Application Data continuation of application No. 14/926,023, filed on Oct. 29, 2015, now Pat. No. 9,563,467.

(51) Int. Cl.
*G06F 12/084* (2016.01)
*G06F 13/16* (2006.01)
*G06F 12/0875* (2016.01)

(52) U.S. Cl.
CPC ...... *G06F 13/1663* (2013.01); *G06F 12/0875* (2013.01); *G06F 2212/452* (2013.01); *G06F 2212/621* (2013.01)

(56) References Cited

U.S. PATENT DOCUMENTS

| | | | |
|---|---|---|---|
| 5,826,093 | A | 10/1998 | Assouad et al. |
| 6,101,420 | A | 8/2000 | VanDoren et al. |
| 6,349,361 | B1 | 2/2002 | Altman et al. |
| 6,519,685 | B1 | 2/2003 | Chang |
| 6,742,139 | B1 | 5/2004 | Forsman et al. |
| 7,206,903 | B1 | 4/2007 | Moir et al. |
| 7,269,694 | B2 | 9/2007 | Tremblay et al. |
| 7,552,290 | B2 | 6/2009 | Alsup |
| 7,565,475 | B2 | 7/2009 | Purcell et al. |
| 7,725,662 | B2 | 5/2010 | Saha et al. |
| 7,836,435 | B2 | 11/2010 | Zhang et al. |
| 8,051,248 | B2 | 11/2011 | Frank et al. |
| 8,161,247 | B2 | 4/2012 | Gray et al. |
| 8,209,499 | B2 | 6/2012 | Chou |
| 8,239,633 | B2 | 8/2012 | Wood et al. |
| 8,250,331 | B2 | 8/2012 | Yamada et al. |
| 8,375,175 | B2 | 2/2013 | Dice et al. |
| 8,732,416 | B2 | 5/2014 | Damodaran et al. |
| 9,563,467 | B1 | 2/2017 | Gschwind et al. |
| 9,563,468 | B1 | 2/2017 | Gschwind et al. |
| 9,760,397 | B2 | 9/2017 | Greiner et al. |
| 9,916,179 | B2 | 3/2018 | Gschwind et al. |
| 9,916,180 | B2 | 3/2018 | Gschwind et al. |
| 9,921,872 | B2 | 3/2018 | Greiner et al. |
| 2003/0023783 | A1 | 1/2003 | Arimilli et al. |
| 2003/0033510 | A1 | 2/2003 | Dice |
| 2003/0204680 | A1 | 10/2003 | Hardage, Jr. |
| 2007/0186056 | A1 | 8/2007 | Saha et al. |
| 2007/0260942 | A1 | 11/2007 | Rajwar et al. |
| 2008/0243739 | A1 | 10/2008 | Tsien |
| 2008/0244354 | A1 | 10/2008 | Wu et al. |
| 2008/0288725 | A1 | 11/2008 | Moyer et al. |
| 2009/0019209 | A1 | 1/2009 | Shen et al. |
| 2009/0019247 | A1 | 1/2009 | Praun et al. |
| 2010/0023707 | A1 | 1/2010 | Hohmuth et al. |
| 2010/0332770 | A1 | 12/2010 | Dice et al. |
| 2011/0145802 | A1 | 6/2011 | Levanoni et al. |
| 2011/0208921 | A1 | 8/2011 | Pohlack et al. |
| 2011/0209151 | A1 | 8/2011 | Chung et al. |
| 2011/0252202 | A1 | 10/2011 | Heine et al. |
| 2012/0005530 | A1 | 1/2012 | Marathe et al. |
| 2012/0124563 | A1 | 5/2012 | Chung et al. |
| 2012/0151152 | A1 | 6/2012 | Minami et al. |
| 2012/0159084 | A1 | 6/2012 | Pohlack et al. |
| 2012/0210162 | A1 | 8/2012 | Gara et al. |
| 2012/0233411 | A1 | 9/2012 | Pohlack et al. |
| 2012/0324292 | A1 | 12/2012 | Bhat et al. |
| 2013/0046947 | A1 | 2/2013 | Adl-Tabatabai et al. |
| 2013/0290965 | A1 | 10/2013 | Pohlack et al. |
| 2013/0339976 | A1 | 12/2013 | Mueller et al. |
| 2014/0095483 | A1 | 4/2014 | Toillion et al. |
| 2014/0164595 | A1 | 6/2014 | Bray et al. |
| 2016/0179586 | A1 | 6/2016 | Wang et al. |
| 2017/0123840 | A1 | 5/2017 | Gschwind et al. |
| 2017/0123841 | A1 | 5/2017 | Greiner et al. |
| 2017/0123842 | A1 | 5/2017 | Gschwind et al. |
| 2017/0123844 | A1 | 5/2017 | Gschwind et al. |
| 2017/0123845 | A1 | 5/2017 | Greiner et al. |
| 2017/0123846 | A1 | 5/2017 | Gschwind et al. |
| 2017/0123983 | A1 | 5/2017 | Gschwind et al. |

OTHER PUBLICATIONS

Mak et al., "IBM System z10 Processor Cache Subsystem Microarchitecture", IBM J. Res. & Dev. vol. 53, No. 1, Paper 2, 2009, pp. 2:1-2:12.

Mcdonald, Austen, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

Scherer, III et al., "Advanced Contention Management for Dynamic Software Transactional Memory", PODC'05, Jul. 17-20, 2005, Las Vegas, Nevada, Copyright © 2005, ACM, pp. 1-9.

Tomic et al., "EazyHTM: Eager-Lazy Hardware Transactional Memory", MICRO'09, Dec. 12-16, 2009, New York, NY, Copyright © 2009, ACM, pp. 1-11.

IBM, "Principles of Operation", SA22-7832-09; Tenth Edition, Sep. 2012, Copyright © 1990-2012, International Business Machines Corporation, 1,568 Pages.

Intel, "Intel® Architecture Instruction Set Extensions Programming Reference", 319433-012A, Feb. 2012, pp. 1-604.

Mellor-Crummey et al., "Alogrithms for Scalable Synchronization on Shared-Memory Multiprocessors," ACM Transactions on Computer Systems (TOCS), Feb. 1991, ACM, pp. 1-41.

Dash et al., "Energy-Efficient Cache Coherence for Embedded Multi-Processor Systems through Application-Driven Snoop Filtering," 9th EUROMICRO Conference on Digital System Design: Architectures, Methods and Tools, 2006, pp. 1-4, IEEE.

IBM, List of IBM Patents or Patent Applications Treated as Related, Apr. 9, 2019, 2 pages.

```
LABEL    PROBE_AGAIN
TPROBE   A
BRNZ     PROBE_AGAIN
TPROBE   B
BRNZ     PROBE_AGAIN
TBEGINC
LOAD     1, A
LOAD     2, B
STORE    1, B
STORE    2, A
TEND
```

FIG. 14A

```
01  TBEGIN
02  p = head_of_list
03  count = 0
04  while (p != NULL) {
05    if (p->data == Element) {
06      [processing on Element]
07      [TEND and branch out]
08    }
09    count++
10    if (count > 10){
11      TSPROBE
12      if ([other probes]){
13        TABORT
14        [handle abort]
15      }
16    }
17  }
18  TEND
```

FIG. 14B

```
LABEL    QUERY_AGAIN
TQUERY   7
BRNZ     QUERY_AGAIN
TBEGINC  7
LOAD     1, C
LOAD     2, D
STORE    1, D
STORE    2, C
TEND
```

FIG. 14C

| XI-type | RS | WS | Action |
|---|---|---|---|
| Read Only Invalidate | 0 | 0 | do nothing |
| Read Only Invalidate | 0 | 1 | abort transaction |
| Read Only Invalidate | 1 | 0 | if line is exclusive, demote to r/o; abort if necessary |
| Read Only Invalidate | 1 | 1 | abort transaction |
| Exclusive Invalidate | 0 | 0 | do nothing |
| Exclusive Invalidate | 0 | 1 | abort transaction |
| Exclusive Invalidate | 1 | 0 | abort transaction |
| Exclusive Invalidate | 1 | 1 | abort transaction |
| Transaction Probe | 0 | 0 | do nothing |
| Transaction Probe | 0 | 1 | return 'hit on write-set' do not abort transaction |
| Transaction Probe | 1 | 0 | return 'hit on read-set' do not abort transaction |
| Transaction Probe | 1 | 1 | return 'hit on write-set and read set' do not abort transaction |

FIG. 15

| Code | For Current Transaction on any $AP_1$-$AP_N$ |
|---|---|
| 00 | memory location not in use |
| 01 | hit on read-set |
| 10 | hit on write-set |
| 11 | hit on read-set and write-set |

FIG. 16A

| Code | For Current Transaction on First Processor |
|---|---|
| 00 | no $AP_1$-$AP_N$ has issued a probe as to any memory location in read-set or write-set |
| 01 | any $AP_1$-$AP_N$ has issued a probe as to memory locations in read-set |
| 10 | any $AP_1$-$AP_N$ has issued a probe as to memory locations in write-set |
| 11 | any $AP_1$-$AP_N$ has issued a probe as to memory locations in read-set and write-set |

FIG. 16B

| Code | For Current Transaction on this AP |
|---|---|
| 00 | memory location not in use |
| 01 | hit on read-set |
| 10 | hit on write-set |
| 11 | hit on read-set and write-set |

FIG. 16C

INTERPROCESSOR MEMORY STATUS COMMUNICATION

BACKGROUND

This disclosure relates generally to interprocessor communication in a multiprocessor computing environment with transactional memory, and more specifically to communicating memory usage status between processors in such an environment.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (TM) have been introduced, wherein a group of instructions, called a transaction, operate atomically and in isolation (sometimes called "serializability") on a data structure in memory. The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

U.S. Pat. No. 8,250,331, titled "Operating system virtual memory management for hardware transactional memory", issued Aug. 21, 2012, teaches:

> Operating system virtual memory management for hardware transactional memory. A method may be performed in a computing environment where an application running on a first hardware thread has been in a hardware transaction, with transactional memory hardware state in cache entries correlated by memory hardware when data is read from or written to data cache entries. The data cache entries are correlated to physical addresses in a first physical page mapped from a first virtual page in a virtual memory page table. The method includes an operating system deciding to unmap the first virtual page. As a result, the operating system removes the mapping of the first virtual page to the first physical page from the virtual memory page table. As a result, the operating system performs an action to discard transactional memory hardware state for at least the first physical page. Embodiments may further suspend hardware transactions in kernel mode. Embodiments may further perform soft page fault handling without aborting a hardware transaction, resuming the hardware transaction upon return to user mode, and even successfully committing the hardware transaction.

U.S. Patent Application Publication No. US2012/0005530, titled "System and Method for Communication Between Concurrent Transactions Using Transaction Communicator Objects", issued Jan. 5, 2012, teaches:

> Transactional memory implementations may be extended to include special transaction communicator objects through which concurrent transactions can communicate. Changes by a first transaction to a communicator may be visible to concurrent transactions before the first transaction commits. Although isolation of transactions may be compromised by such communication, the effects of this compromise may be limited by tracking dependencies among transactions, and preventing any transaction from committing unless every transaction whose changes it has observed also commits. For example, mutually dependent or cyclically dependent transactions may commit or abort together. Transactions that do not communicate with each other may remain isolated. The system may provide a communicator-isolating transaction that ensures isolation even for accesses to communicators, which may be implemented using nesting transactions. True (e.g., read-after-write) dependencies, ordering (e.g., write-after-write) dependencies, and/or anti-dependencies (e.g., write-after-read dependencies) may be tracked, and a resulting dependency graph may be perused by the commit protocol.

SUMMARY

In a transactional memory environment including a first processor and one or more additional processors, a computer-implemented method includes identifying a memory location and sending a probe request from the first processor to the additional processors. The probe request includes the memory location. The computer implemented method further includes generating, by each additional processor, an indication including whether the memory location is in use for a transaction by the additional processor. The computer-implemented method further includes sending the indication from each additional processor to the first processor and proceeding, by the first processor, based on the indication.

BRIEF DESCRIPTION OF THE DRAWINGS

FIG. 14A presents exemplary pseudocode that calls a TPROBE program, in accordance with at least one embodiment of the invention.

FIG. 14B presents exemplary pseudocode that calls a TSPROBE program, in accordance with at least one embodiment of the invention.

FIG. 14C presents pseudocode that calls a TQUERY program, in accordance with at least one embodiment of the invention.

FIG. 15 is a table that compares the transaction abort behavior of an XI Probe program configured for implementing a TPROBE program with that of other cross-interrogate transactions.

FIG. 16A is a table of exemplary status codes for a TPROBE program, in accordance with at least one embodiment of the invention.

FIG. 16B is a table of exemplary status codes for a TSPROBE program in the context of a transaction, in accordance with at least one embodiment of the invention.

FIG. 16C is a table of exemplary status codes for an XI Probe program that implements a TPROBE program, in accordance with at least one embodiment of the invention.

DETAILED DESCRIPTION

Figure 1:
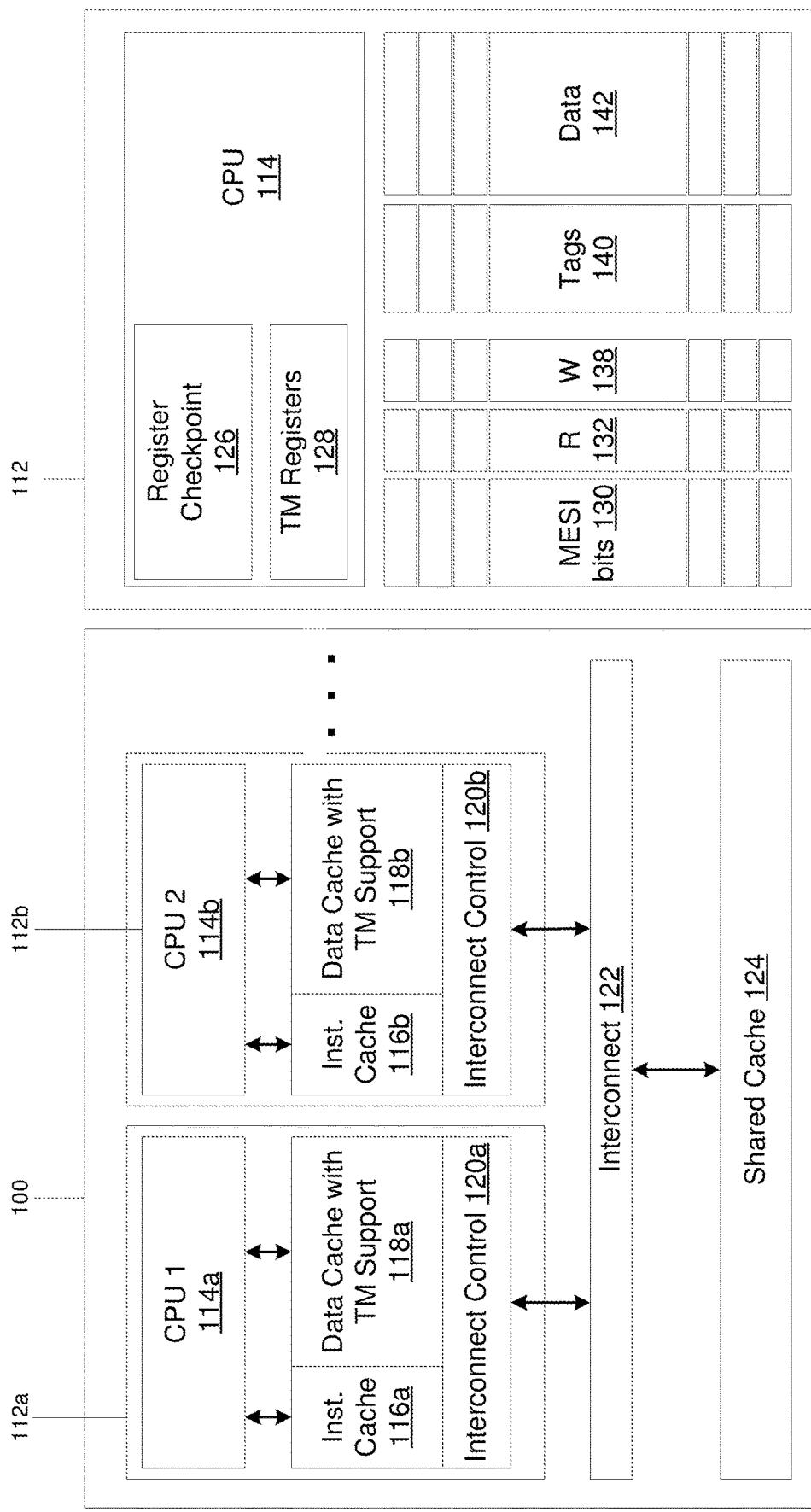
FIGS. 1A and 1B depict an example multicore Transactional Memory environment, in accordance with at least one embodiment of the present invention.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor could be packaged on a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_E-LIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's writeset). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT
CPUID
PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

- Operations on X87 and MMX architecture state. This includes all MMX and X87 instructions, including the FXRSTOR and FXSAVE instructions.
- Update to non-status portion of EFLAGS: CLI, STI, POPFD, POPFQ, and CLTS.
- Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.
- Ring transitions: SYSENTER, SYSCALL, SYSEXIT, and SYSRET.
- TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).
- Processor state save: XSAVE, XSAVEOPT, and XRSTOR.
- Interrupts: INTn, INTO.
- IO: IN, INS, REP INS, OUT, OUTS, REP OUTS and their variants.
- VMX: VMPTRLD, VMPTRST, VMCLEAR, VMREAD, VMWRITE, VMCALL, VMLAUNCH, VMRESUME, VMXOFF, VMXON, INVEPT, and INVVPID.
- SMX: GETSEC.
- UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution Embodiments

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

FIGS. 1A and 1B depict an example of a multicore TM environment. FIG. 1A shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 116b for caching instructions from memory to be executed and a Data Cache 118a, 118b with TM support for caching data (operands) of memory locations to be operated on by the CPU 114a, 114b (in FIG. 1A, each CPU 114a, 114b and its associated caches are referenced as 112a, 112b). In an implementation, caches of multiple dies 100 are interconnected to support cache coherency between the caches of the multiple dies 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die may have access to a shared cache 124, shared amongst all the processors of all the dies 100.

FIG. 1B shows the details of an example transactional CPU environment 112, having a CPU 114, including additions to support TM. The transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by the CPU 114 while executing a transaction and W bits 138 showing a line has been written-to by the CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

|  |  | VERSIONING | |
|---|---|---|---|
|  |  | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
|  | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use the W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, the MESI 130 state transitions (cache line indicators corresponding to Modified, Exclusive, Shared, and Invalid code states) are left mostly unchanged. Outside of a transaction, the MESI 130 state transitions are left completely unchanged. When reading a line inside a transaction, the standard coherence transitions apply (S (Shared)→S, I (Invalid)→S, or I→E (Exclusive)), issuing a load miss as needed, but the R 132 bit is also set. Likewise, writing a line applies the standard transitions (S→M, E→I, I→M), issuing a miss as needed, but also sets the W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have the line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears the W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy Optimistic (LO)

Another popular TM design is Lazy-Optimistic (LO), which stores its write-set in a "write buffer" or "redo log" and detects conflicts at commit time (still using the R 132 and W 138 bits).

Versioning: Just as in the EP system, the MESI protocol of the LO design is enforced outside of the transactions. Once inside a transaction, reading a line incurs the standard MESI transitions but also sets the R 132 bit. Likewise, writing a line sets the W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and the R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

|  | LHI | R0,0 | *initialize retry count=0 |
|---|---|---|---|
| loop | TBEGIN |  | *begin transaction |
|  | JNZ | abort | *go to abort code if CC1=0 |
|  | LT | R1, lock | *load and test the fallback lock |
|  | JNZ | lckbzy | *branch if lock busy |
|  | ... perform operation ... |  |  |
|  | TEND |  | *end transaction |
|  | ... ... | ... ... |  |
| lckbzy | TABORT |  | *abort if lock busy; this |
|  |  |  | *resumes after TBEGIN |
| abort | JO | fallback | *no retry if CC=3 |
|  | AHI | R0, 1 | *increment retry count |
|  | CIJNL | R0,6, fallback | *give up after 6 attempts |
|  | PPA | R0, TX | *random delay based on retry count |
|  | ... potentially wait for lock to become free ... |  |  |
|  | J | loop | *jump back to retry fallback |
|  | OBTAIN | lock | *using Compare&Swap |
|  | ... perform operation ... |  |  |
|  | RELEASE | lock |  |
|  | ... ... | ... ... |  |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, the CPU 114 assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

TBEGINC          *begin constrained transaction
... perform operation ...
TEND             *end transaction Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 2:
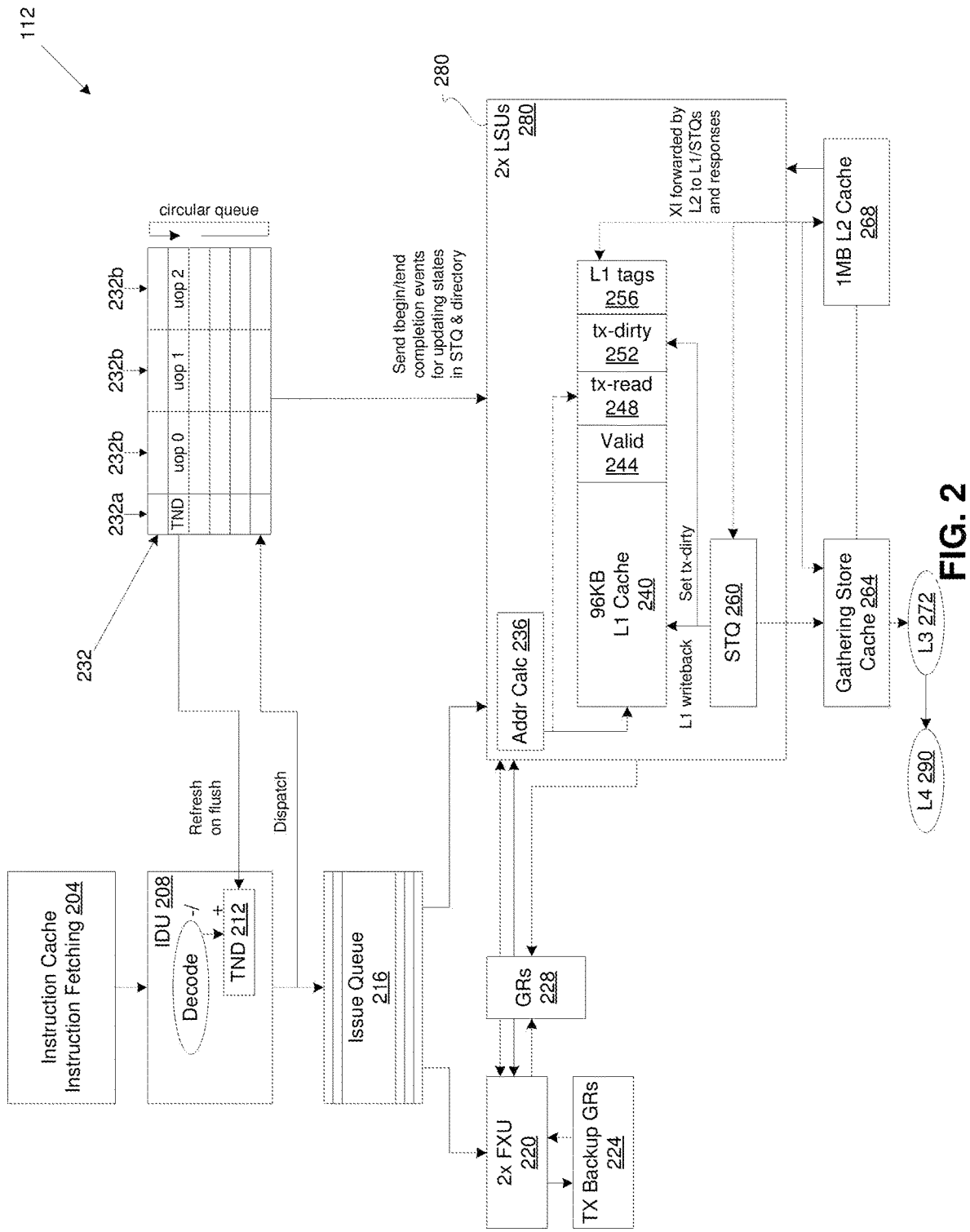
FIG. 2 depicts example components of an example CPU, in accordance with at least one embodiment of the present invention.

With reference to FIG. 2, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232$b$) are written into a unified issue queue 216, from where they can be issued out-of-order. Up to two fixed-point, one floating-point, two load/store, and two branch instructions can execute every cycle. A Global Completion Table (GCT) 232 holds every micro-op and a transaction nesting depth (TND) 232$a$. The GCT 232 is written in-order at decode time, tracks the execution status of each micro-op 232$b$, and completes instructions when all micro-ops 232$b$ of the oldest instruction group have successfully executed.

The level 1 (L1) data cache 240 is a 96 KB (kilo-byte) 6-way associative cache with 256 byte cache-lines and 4 cycle use latency, coupled to a private 1 MB (mega-byte) 8-way associative 2nd-level (L2) data cache 268 with 7 cycles use-latency penalty for L1 240 misses. L1 240 cache is the cache closest to a processor and Ln cache is a cache at the nth level of caching. Both L1 240 and L2 268 caches are store-through. Six cores on each central processor (CP) chip share a 48 MB 3rd-level store-in cache, and six CP chips are connected to an off-chip 384 MB L4; cache 290, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; the L1 240 and L2 268 are store-through and thus do not contain dirty lines. The L3 272 and L4 caches 290 are store-in and track dirty states. Each cache is inclusive of all its connected lower level caches.

Coherency requests are called "cross interrogates" (XIs) and may be sent hierarchically from higher level to lower-level caches, and between the L4s 290. In embodiments implementing the L4s 290, when one core misses the L1 240 and L2 268 and requests the cache line from its local L3 272, the L3 272 checks whether it owns the line, and if necessary sends an XI to the currently owning L2 268/L1 240 under that L3 272 to ensure coherency, before it returns the cache line to the requestor. If the request also misses the L3 272, the L3 272 sends a request to the L4 290, which enforces coherency by sending XIs to all necessary L3s under that L4, and to the neighboring L4s. Then the L4 responds to the requesting L3 which forwards the response to the L2 268/L1 240. More generally, XIs may be transmitted from higher to lower cache levels in systems with more or fewer levels. For example, various embodiments may lack an L4 entirely, and in such embodiments XIs may be communicated between L3s or between the lowest level caches that are implemented on the system. Even more generally, XIs may be understood as a hardware mechanism for communicating messages between processors, whether through the caches, main memory, or otherwise.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. The L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 2 depicts example components of an example CPU environment 112, including a CPU 114 and caches/components with which it interacts (such as those depicted in FIGS. 1A and 1B). The instruction decode unit 208 (IDU) keeps track of the current transaction nesting depth 212 (TND). When the IDU 208 receives a TBEGIN instruction, the nesting depth 212 is incremented, and conversely decremented on TEND instructions. The nesting depth 212 is written into the GCT 232 for every dispatched instruction. When a TBEGIN or TEND is decoded on a speculative path that later gets flushed, the IDU's 208 nesting depth 212 is refreshed from the youngest GCT 232 entry that is not flushed. The transactional state is also written into the issue queue 216 for consumption by the execution units, mostly by the Load/Store Unit (LSU) 280, which also has an effective address calculator 236 is included in the LSU 280. The TBEGIN instruction may specify a transaction diagnostic block (TDB) for recording status information, should the transaction abort before reaching a TEND instruction.

Similar to the nesting depth, the IDU 208/GCT 232 collaboratively track the access register/floating-point register (AR/FPR) modification masks through the transaction nest; the IDU 208 can place an abort request into the GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop2) will be executed by one of the two fixed point units (FXUs) 220 to save a pair of GRs 228 into a special transaction-backup register file 224, that is used to later restore the GR 228 content in case of a transaction abort. Also the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in the issue queue 216 so that the LSU 280 can treat it appropriately. TEND is a no-op at execution time, the ending of the transaction is performed when TEND completes.

As mentioned, instructions that are within a transaction are marked as such in the issue queue 216, but otherwise execute mostly unchanged; the LSU 280 performs isolation tracking as described in the next section.

Since decoding is in-order, and since the IDU 208 keeps track of the current transactional state and writes it into the issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through the GCT 232 at completion time. The length of transactions is not limited by the size of the GCT 232, since general purpose registers (GRs) 228 can be restored from the backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Execution

The Load/Store Unit 280 tracks cache lines that were accessed during transactional execution, and triggers an abort if an XI from another CPU (or an LRU-XI) conflicts with the footprint. If the conflicting XI is an exclusive or demote XI, the LSU 280 rejects the XI back to the L3 272 in the hope of finishing the transaction before the L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

The L1 cache directory 240 is traditionally implemented with static random access memories (SRAMs). For the transactional memory implementation, the valid bits 244 (64 rows×6 ways) of the directory have been moved into normal logic latches, and are supplemented with two more bits per cache line: the TX-read 248 and TX-dirty 252 bits.

The TX-read 248 bits are reset when a new outermost TBEGIN is decoded (which is interlocked against a prior still pending transaction). The TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in the store queue (STQ) 260 entry of the store instruction. At write-back time, when the data from the STQ 260 is written into the L1 240, the TX-dirty bit 252 in the L1-directory 256 is set for the written cache line. Store write-back into the L1 240 occurs only after the store instruction has completed, and at most one store is written back per cycle. Before completion and write-back, loads can access the data from the STQ 260 by means of store-forwarding; after write-back, the CPU 114 (FIG. 1B) can access the speculatively updated data in the L1 240. If the transaction ends successfully, the TX-dirty bits 252 of all cache-lines are cleared, and also the TX-marks of not yet written stores are cleared in the STQ 260, effectively turning the pending stores into normal stores.

On a transaction abort, all pending transactional stores are invalidated from the STQ 260, even those already completed. All cache lines that were modified by the transaction in the L1 240, that is, have the TX-dirty bit 252 on, have their valid bits turned off, effectively removing them from the L1 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When the L1 240 receives an XI, L1 240 accesses the directory to check validity of the XI'ed address in the L1 240, and if the TX-read bit 248 is active on the XI'ed line and the XI is not rejected, the LSU 280 triggers an abort. When a cache line with active TX-read bit 248 is LRU'ed from the L1 240, a special LRU-extension vector remembers for each of the 64 rows of the L1 240 that a TX-read line existed on that row. Since no precise address tracking exists for the LRU extensions, any non-rejected XI that hits a valid extension row the LSU 280 triggers an abort. Providing the LRU-extension effectively increases the read footprint capability from the L1-size to the L2-size and associativity, provided no conflicts with other CPUs 114 against the non-precise LRU-extension tracking causes aborts.

The store footprint is limited by the store cache size (the store cache is discussed in more detail below) and thus implicitly by the L2 268 size and associativity. No LRU-extension action needs to be performed when a TX-dirty 252 cache line is LRU'ed from the L1 240.

Store Cache

In prior systems, since the L1 240 and L2 268 are store-through caches, every store instruction causes an L3 272 store access; with now 6 cores per L3 272 and further improved performance of each core, the store rate for the L3 272 (and to a lesser extent for the L2 268) becomes problematic for certain workloads. In order to avoid store queuing delays, a gathering store cache 264 had to be added, that combines stores to neighboring addresses before sending them to the L3 272.

For transactional memory performance, it is acceptable to invalidate every TX-dirty 252 cache line from the L1 240 on transaction aborts, because the L2 268 cache is very close (7 cycles L1 240 miss penalty) to bring back the clean lines. However, it would be unacceptable for performance (and silicon area for tracking) to have transactional stores write the L2 268 before the transaction ends and then invalidate all dirty L2 268 cache lines on abort (or even worse on the shared L3 272).

The two problems of store bandwidth and transactional memory store handling can both be addressed with the gathering store cache 264. The cache 232 is a circular queue of 64 entries, each entry holding 128 bytes of data with byte-precise valid bits. In non-transactional operation, when a store is received from the LSU 280, the store cache checks whether an entry exists for the same address, and if so gathers the new store into the existing entry. If no entry exists, a new entry is written into the queue, and if the number of free entries falls under a threshold, the oldest entries are written back to the L2 268 and L3 272 caches.

When a new outermost transaction begins, all existing entries in the store cache are marked closed so that no new stores can be gathered into them, and eviction of those entries to L2 268 and L3 272 is started. From that point on, the transactional stores coming out of the LSU 280 STQ 260 allocate new entries, or gather into existing transactional entries. The write-back of those stores into L2 268 and L3 272 is blocked, until the transaction ends successfully; at that point subsequent (post-transaction) stores can continue to gather into existing entries, until the next transaction closes those entries again.

The store cache 264 is queried on every exclusive or demote XI, and causes an XI reject if the XI compares to any active entry. If the core is not completing further instructions while continuously rejecting XIs, the transaction is aborted at a certain threshold to avoid hangs.

The LSU 280 requests a transaction abort when the store cache 264 overflows. The LSU 280 detects this condition when it tries to send a new store that cannot merge into an existing entry, and the entire store cache 264 is filled with stores from the current transaction. The store cache 264 is managed as a subset of the L2 268: while transactionally dirty lines can be evicted from the L1 240, they have to stay resident in the L2 268 throughout the transaction. The maximum store footprint is thus limited to the store cache size of 64×128 bytes, and it is also limited by the associativity of the L2 268. Since the L2 268 is 8-way associative and has 512 rows, it is typically large enough to not cause transaction aborts.

If a transaction aborts, the store cache 264 is notified and all entries holding transactional data are invalidated. The store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 228 to restore.

The CPU 114 supports a special millicode-only instruction to read out the backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort subroutine.

The Extract Transaction Nesting Depth (ETND) instruction may also be millicoded, since it is not performance critical; millicode loads the current nesting depth out of a special hardware register and places it into a GR 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs 114 to stop all conflicting work, retry the local transaction, before releasing the other CPUs 114 to continue normal processing. Multiple CPUs 114 must be coordinated to not cause deadlocks, so some serialization between millicode instances on different CPUs 114 is required.

In various embodiments, the present invention introduces into the hardware TM environment a suite of machine instructions for communicating between processors as to the transactional memory status of the various processors. Broadly, a TPROBE instruction provides a mechanism by which any processor in the system can check the transactional status of a given memory location. Complementarily, a TSPROBE instruction provides a mechanism by which a processor may determine if any other processors have, within a given predetermined period before present, issued a TPROBE. At a coarser level of granularity, a TQUERY instruction provides a mechanism by which a processor may determine whether there are any transactions going on in the system or in a given subset of processors within the system. Additionally, XI Probe is disclosed as a cross-interrogate (XI) that may, in some embodiments, implement TPROBE and TSPROBE.

Figure 3A:
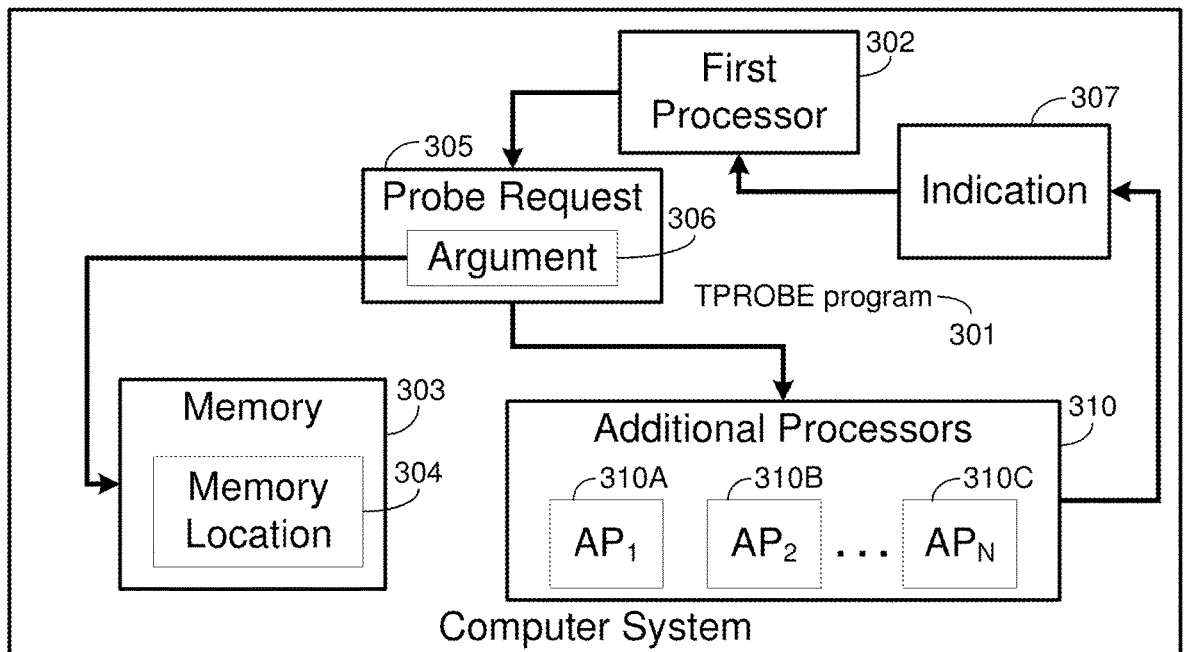
FIG. 3A is a data flow diagram for a TPROBE program in accordance with at least one embodiment of the present invention.

FIG. 3A displays a data flow diagram that describes, in general, the transmission of a probe request and response for a TPROBE instruction, in accordance with at least one embodiment of the invention. In the computer system 300, the first processor 302 may act, for example responsive to an instruction to perform a TPROBE, which may be understood, for the embodiment depicted in FIG. 3A, as the TPROBE program 301 (in the Claims, "t_probe program"). The first processor 302 sends a probe request 305, by any available path or mechanism to one or more additional processors 310. The additional processors 310 include an AP$_1$ 310A, AP$_2$ 310B, etc. up to AP$_N$ 310C, and may describe all of the processors in the computer system 300 or only a subset thereof.

Referring still to the embodiment depicted in FIG. 3A, the probe request 305 may optionally include an argument 306, by which the probe request 305 includes a memory location 304 within the memory 303. The argument 306 may be omitted in various implementations that do not require one or more specific memory locations 304 to be identified. The memory 303, in the depicted embodiment, may be understood as shared cache, main memory, shared memory, general memory, or, more broadly any memory region, device, or article that may be accessed by the first processor 302 and the additional processors 310 such that the potential for a conflict exists. In one contemplated embodiment, the memory location 304 (i.e. the contents of one more addresses in main memory) is stored in one or more cache lines of shared cache, subject to the hardware TM's coherence protocol such that any processor of the computer system 300 may operate on the memory location 304 with full coherence support, in accordance with the modified MESI protocol or another coherence protocol, and with the assurance that no load or store operation on any processor may access the location that corresponds to the cache line in main memory or another resource. As described above, various contemplated implementations of hardware TM treat memory access conflicts as a transaction abort conditions, and thus preventing memory access conflicts may directly lead to reduced aborts and improved performance of the computer system 300. In particularly contemplated embodiments, the memory location 304 is stored in one or more cache lines.

Referring still to the embodiment depicted in FIG. 3A, the additional processors 310 respond to the TPROBE by sending an indication 307 back to the first processor 302. Transmission of the indication 307 may be accomplished by any available path or mechanism. The content of the indication may be whether the receiving processor is using the referenced memory location 304.

Figure 3B:
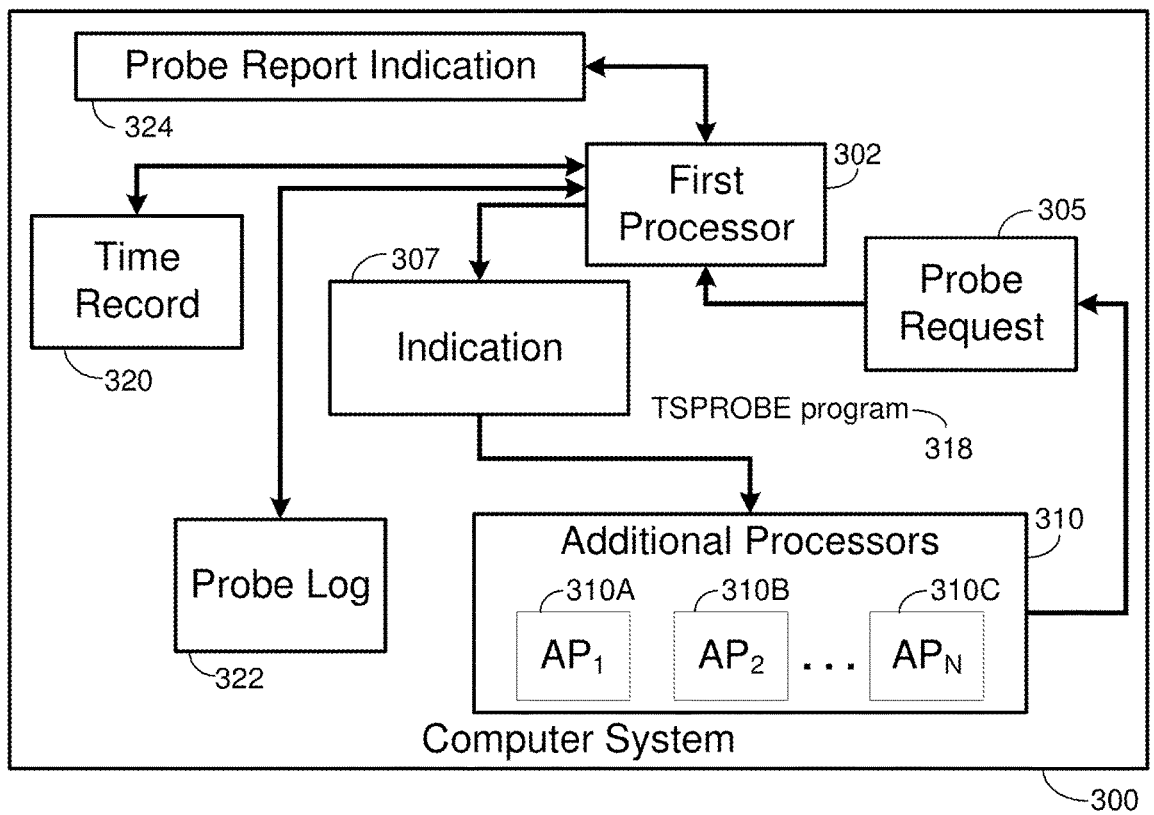
FIG. 3B is a data flow diagram for a TSPROBE program, in accordance with at least one embodiment of the present invention.

FIG. 3B presents a data flow diagram for a TSPROBE program 318 within the context of the computer system 300, in accordance with one or more embodiments of the present invention. In the depicted embodiment, the first processor 302 listens for probe requests 305, such as TPROBEs of the present invention, on the additional processors 310, which include AP$_1$ 310A, AP$_2$ 310B, up to AP$_N$ 310C. The first processor may respond, as would an additional processor in TPROBE, with the indication 307.

In the depicted embodiment, the first processor may initialize and store a time record 320 at various times. The time record may represent a real-world time value, and may be a system timestamp relative to a fixed time such as the UNIX epoch or relative to a variable time reference such as system start time or other event. The time record may be of nanosecond precision or other timescale suitable for measuring cycles or instructions of the one or more processors of the computer system 300. Alternatively, the time reference may include a count of cycles or instructions of the computer system 300 or its processors, without reference to real world time. The first processor 302 may initialize or reset the time record 320 at various times, as described in further detail below, for example when initiating a new transaction with a TBEGIN instruction or when executing a TSPROBE instruction again, thus referring to the time since last executing a TSPROBE.

Referring still to the embodiment of the TSPROBE program 318 depicted in FIG. 3A, the first processor 302 may maintain a probe log 322. The probe log 322 may be implemented in main memory, cache, registers, or a dedicated private storage circuit. The first processor 302 may record, in the probe log, each instance of TPROBE or other probe request 305 that it receives. At a minimum, the TSPROBE program may maintain, in the probe log 322, a count of probe requests 305 that are received. In other embodiments, the probe log 322 may include records of the memory location(s) referenced in each probe request 305, when each probe request 305 occurred, and/or which additional processor 310 each probe request 305 originated from.

Thus, the TSPROBE program 318 may generate, based on the probe log 322, a probe report indication 324, which may be returned as the result of executing the TSPROBE instruction. The probe report indication 324 includes, in more generic embodiments, whether any TPROBEs have been received from other processors. In alternative embodiments, the probe report indication 324 includes, also based on the probe log 322, whether any TPROBEs have been received that were directed to any memory location of a current transaction read-set or write-set. In additional alternative embodiments, the probe report indication 324 includes, also based on the probe log 322, whether any TPROBES have been received that were directed to an arbitrary memory location. Such an arbitrary memory location may be included as an argument to the TSPROBE instruction.

Figure 4:
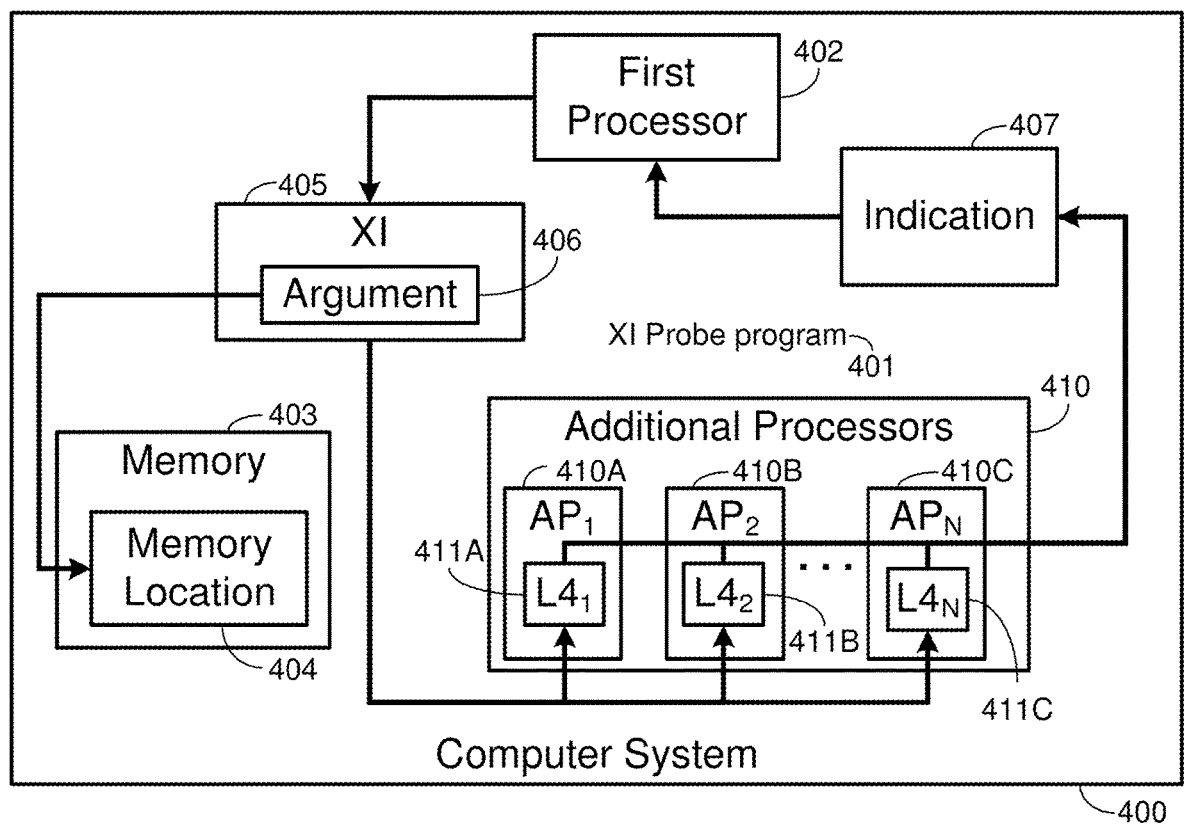
FIG. 4 is a data flow diagram for an XI Probe program in accordance with at least one embodiment of the present invention.

FIG. 4 displays a data flow diagram that describes an embodiment of the XI Probe program 401 operating in a computer system 400. In the depicted embodiment, the first processor 402, responsive to an execution request, for example of a micro-op or millicode instruction, for the XI Probe program 401, issues an XI 405, which may optionally include an argument 406 that identifies a memory location 404 within the memory 403. The argument 406 may be identified by receiving one or more memory locations (including, e.g., a reference, pointer, address, or other specification of one or more memory locations) in the execution request to the XI Probe program 401. The additional processors 410 may each include a level-four cache 411A-411C. It should be noted, however, that the L4 caches 411A-411C, while shown in 1:1 correspondence with $AP_1$ 410A-$AP_N$ 410C need not be private caches as to each processor, but may, in various embodiments, be shared between two or more processors. Blocks 411A-411C of FIG. 4 may therefore be best understood as denoting, for the depicted embodiment, only that each processor has access to an L4 cache, and the number of L4 caches may be smaller than the number of processors. In accordance with other XIs described above, the XI Probe program 401 may broadcast to the additional processors 410, specifically $AP_1$ 410A, $AP_2$ 410B, etc. up to $AP_N$ 410C by copying a directive into each level four cache $L4_1$ 411A, $L4_2$ 411B, etc. up to $L4_N$ 411C which correspond to each Additional Processor 410. Each Additional Processor 410 may generate an indication 407 and return it to the first processor 402, for example via the first processor's 402 L4 cache.

Figure 5A:
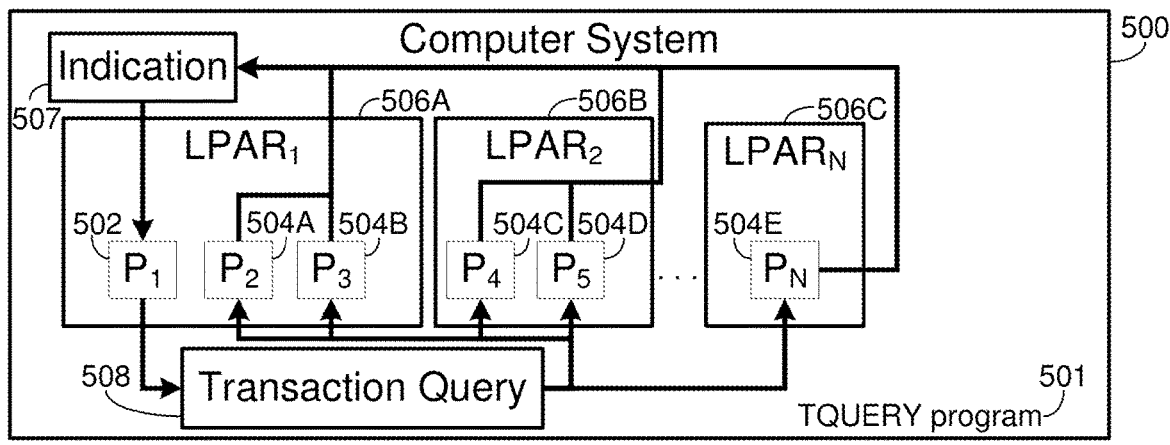
FIG. 5A is a data flow diagram for a TQUERY program directed to all processors in the multiprocessor environment, in accordance with at least one embodiment of the invention.
Figure 5B:
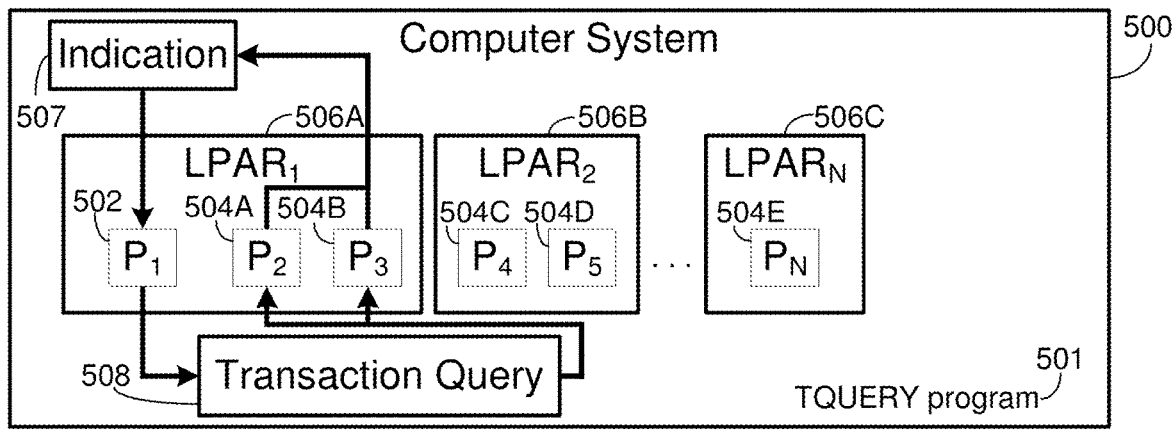
FIG. 5B is a data flow diagram for a TQUERY program directed to all processors sharing a common logical partition with the querying processor, in accordance with at least one embodiment of the invention.
Figure 6:
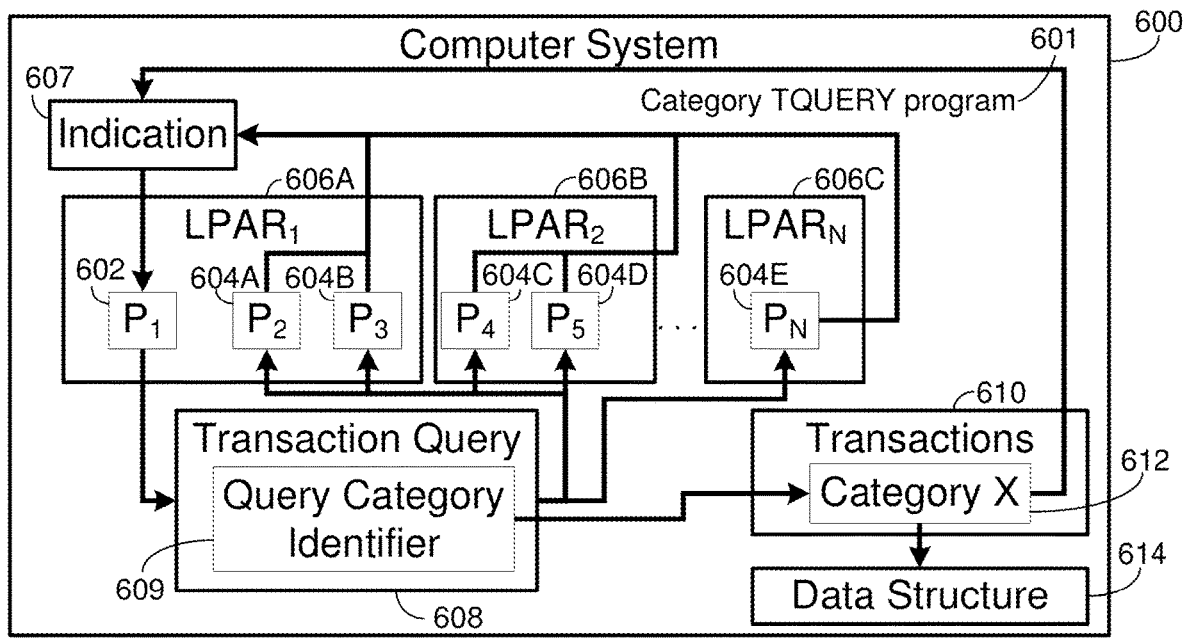
FIG. 6 is a data flow diagram for a TQUERY program in an environment supporting a transaction category scheme, in accordance with at least one embodiment of the invention.

FIGS. 5A, 5B, and 6 display various possible data flows for a TQUERY program 501 or a category TQUERY program 601, in accordance with embodiments of the invention. In the embodiment depicted in FIG. 5A, the computer system 500 includes the first processor $P_1$ 502 issuing a transaction query 508 to a processor set. In embodiments of TQUERY, the transactional memory environment supports one or more transactions by the first processor 602 and by the processor set. For the depicted embodiment, the processor set includes processors $P_2$ 504A, $P_3$ 504B, $P_4$ 504C, $P_5$ 504D, etc. up to $P_N$ 504E, or all processors in the computer system 500. In the embodiment shown, $P_1$ 502 shares a logical partition (LPAR) $LPAR_1$ 506A with $P_2$ 504A and $P_3$ 504B. Similarly, $LPAR_2$ 506B includes $P_4$ 504C and $P_5$ 504D, and any number of LPARs may exist up to $LPAR_N$ 506C, which includes PN 504E. In embodiments where LPARs are not implemented or not restrictive as to interprocessor communication, the processor set includes all processors of the computer system 500, as depicted in FIG. 5A. Each processor in the processor set returns an indication 507 to $P_1$ 502. For TQUERY, the content of the indication may include whether the particular responding processor is engaged in a transaction.

In some embodiments, LPARs may be implemented with strong separation on interprocessor communication such that the various processors may only communicate with and access shared resources for their own LPAR. Similarly, LPARs may be created by software convention in systems that do not otherwise implement them. As to such implementations, FIG. 5B discloses a case where the transaction query 508 is sent from $P_1$ 502 to the processor set, but where the processor set is limited to $LPAR_1$ 506A, which includes $P_1$ 502 along with $P_2$ 504A and $P_3$ 504B. Thus, the processor set may include all processors sharing a logical partition 506A with the first processor 502. Similarly, the processor set may include more than one LPAR, but fewer than all of the LPARs. $P_4$ 504C, $P_5$ 504D, up to $P_N$ 504E belong to different LPARs, and thus do not receive the transaction query 508.

FIG. 6 depicts an embodiment of the category TQUERY program 601 on a computer system 600 that supports a transaction category scheme, such that each of the one or more transactions has associated therewith a category identifier. In the depicted embodiment of FIG. 6, $P_1$ 602 similarly sends a transaction query 608 to the other processors in the processor set. In the depicted embodiment, all processors $P_2$ 604A, $P_3$ 604B, $P_4$ 604C, $P_5$ 604D, up to $P_N$ 604E, which may be in any of $LPAR_1$ 606A, $LPAR_2$ 606B, up to $LPAR_N$ 606C, all similarly send the indication 607 back to $P_1$ 602. As with the embodiment depicted in FIG. 5B, an implementation having a transaction category scheme may likewise limit the set of processors to only one or more LPARs.

Referring still to the embodiment depicted in FIG. 6, a transaction category scheme generally includes allowing an argument to a TBEGIN instruction whereby a label, for example a numeric value, may be assigned to the transaction that is started. The labels may be may be accessed and assigned at the software layer. The transaction category scheme may be maintained by at least one mechanism selected from the group consisting of (a) a software convention; (b) an operating system application programming interface; and (c) a hypervisor application programming interface. In an exemplary usage, each category identifier may be associated with a data structure 614. The data structure 614 may generally be any software data structure that is created at the software level and exists in memory; more specifically, the data structure 614 may include at least one data structure selected from the group consisting of: (a) a lock; (b) a semaphore; (c) a queue; a stack; (e) a linked list; and (f) a hash table. Software may be configured to assign to any transactions 610 that operate on the data structure's 614 underlying memory locations a given category, Category X 612. In some embodiments, the TQUERY program may accept a wildcard, variable, or expression as an argument such that more than one category may be matched by the same TQUERY.

Referring still to the embodiment depicted in FIG. 6, the transaction query 608 includes a query category identifier 609, which may be specified as an argument to the TQUERY program. In the depicted embodiment, the content of the indication 607 is whether the particular processor $P_2$ 604A-$P_N$ 604E is engaged in a transaction of Category X 612. Thus, via TQUERY, it is possible to expose to the software layer whether the memory underlying the data structure 614 is in use, from which a developer may infer that the data structure 614 itself is in use, and thus accessing it should be delayed.

In some embodiments, the transactional memory environment may have, as a feature the behavior described above that transactions are aborted in response to detected attempts to access a shared resource via an XI. Distinctly, in various embodiments of TPROBE, TSPROBE, and TQUERY, as well as embodiments of XI Probe, the additional processors 310 do not detect any access to the memory location 304. Specifically, the additional processors 310 do not interpret the probe request 305 or the transaction query 508/608 as an abort condition.

FIGS. 7-13 display flowchart diagrams for the steps of the various disclosed methods of the present invention. It should be noted that, in general, all depicted methods may operation in a transactional memory environment including a first processor 302 and one or more additional processors 310. In addition, the TPROBE, TSPROBE, and TQUERY programs may each be executed as a machine instruction to the first processor 302. Where XI Probe implements one of the machine instructions, XI Probe may be executable as a micro-op.

Figure 7:
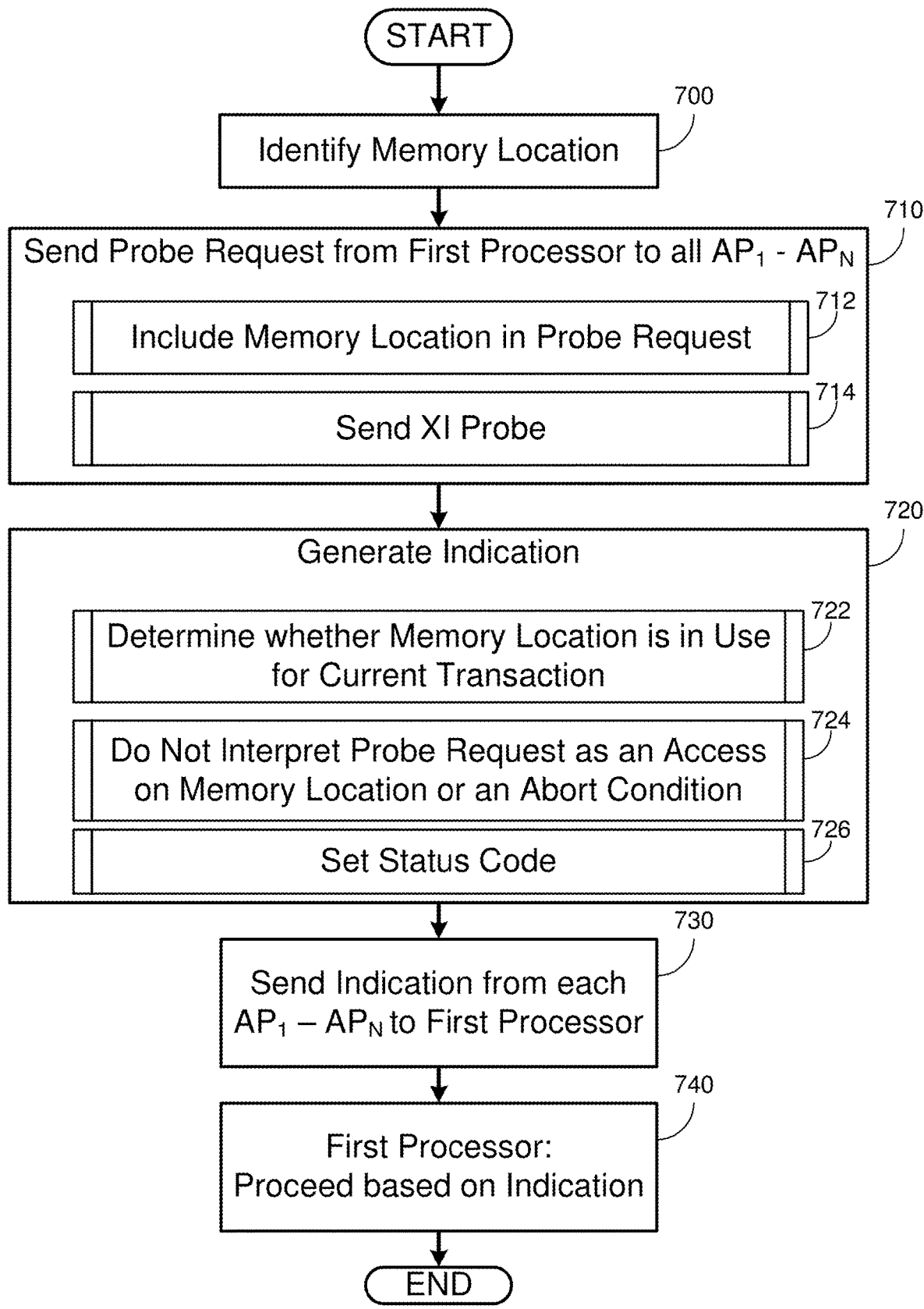
FIG. 7 is a flowchart diagram for a TPROBE program, in accordance with at least one embodiment of the invention.

Referring now to FIG. 7, FIG. 7 is a flowchart diagram depicting the operational steps of a TPROBE program, in accordance with at least one embodiment of the invention. At step 700, the TPROBE program identifies a memory location. The memory location 304 may be identified in the execution request to TPROBE and may be generally understood as a memory location that is of interest at the software layer. At step 710, the TPROBE program sends the probe request 305 from the first processor 302 to the one or more additional processors 310, including, at step 712, the memory location 304 via the argument 306.

The TPROBE program may, but need not, be implemented by an embodiment of the XI Probe program. Thus, the probe request 305 may include a cross-interrogate. In such embodiments, the TPROBE program may execute step 714, sending an XI Probe, by calling the XI Probe program, either as a micro-op, millicode, invoking dedicated hardware, or otherwise.

Referring still to the flowchart for an embodiment of the TPROBE program of FIG. 7, at step 720, the TPROBE program generates the indication 307 by each of the one or more additional processors 310. The indication 307 includes whether the memory location 304 is in use for a transaction on the particular responding additional processor 310. At step 722, each additional processor 310 determines whether the memory location 304 is in use for a transaction by that processor 310.

At step 724, the additional processors 310 do not detect any access to the memory location 304. Equivalently, the additional processors 310 do not interpret the probe request 305 as an abort condition.

The current transaction may have associated therewith a read-set and a write-set. The indication may include whether the memory location 304 is in use for the current transaction read-set, write-set, or both, with at least one of the read-set or the write-set each including one or more memory locations. Each of the one or more memory locations may include one or more cache lines. In some embodiments, the indication 307 may include at least one communication mechanism selected from the group consisting of a status code, a condition code, and a flag setting. Where the indication 307 includes a status code, the status code may be represented by two bits, and which each additional processor 310 may set at step 726. FIG. 16A displays a table of exemplary two-bit status codes for use in a TPROBE program. The two bits may be in any one state selected from the group consisting of state 00, state 01, state 10, and state 11.

As shown in the table of FIG. 16A, state 00 may denote that the memory location 304 is not in use for the transaction. State 01 may denote that the memory location 304 is in use for the read-set. State 10 may denote that the memory location 304 is in use for the write-set. State 11 may denote that the memory location 304 is in use for both the read-set and the write-set.

At step 730, the TPROBE program sends the indication 307 from the one or more additional processors 310 to the first processor 302. At step 740, the first processor 302 proceeds based on the indication 307. In particular, the first processor may combine the status codes and make them available to the software layer, or the first process may be instructed to branch based on the indication 307. FIG. 14A displays a segment of assembly language-like pseudocode, which shows how a TPROBE program may be executed as a machine instruction.

In the pseudocode program of FIG. 14A, the TPROBE instruction is executed as to two memory locations A, and B. After each TPROBE statement, a BRNZ (Break if Not Zero) instruction is executed as to the result of TPROBE, with a reference back to a label PROBE_AGAIN. In the above-described status code scheme, the state 00 denotes that the memory location is not in use, and any nonzero status indicates that the memory location is in use. The TPROBEs are followed by a simple transaction that swaps the contents of memory locations A and B by loading each into registers 1 and 2, respectively, and storing back in reverse order. The effect of the BRNZ instructions with respect to the TPROBEs is to check whether first memory location A, and then memory location B, are in use by other processors on the system, and to repeatedly check until the memory locations become available, and then to conduct the transaction. The example memory location swapping transaction is simple and short, however the TPROBE program may be understood as of relatively greater utility the more complex and lengthy the planned transaction is, because preventing an abort condition is of greater value for more complex, longer transactions.

Figure 8:
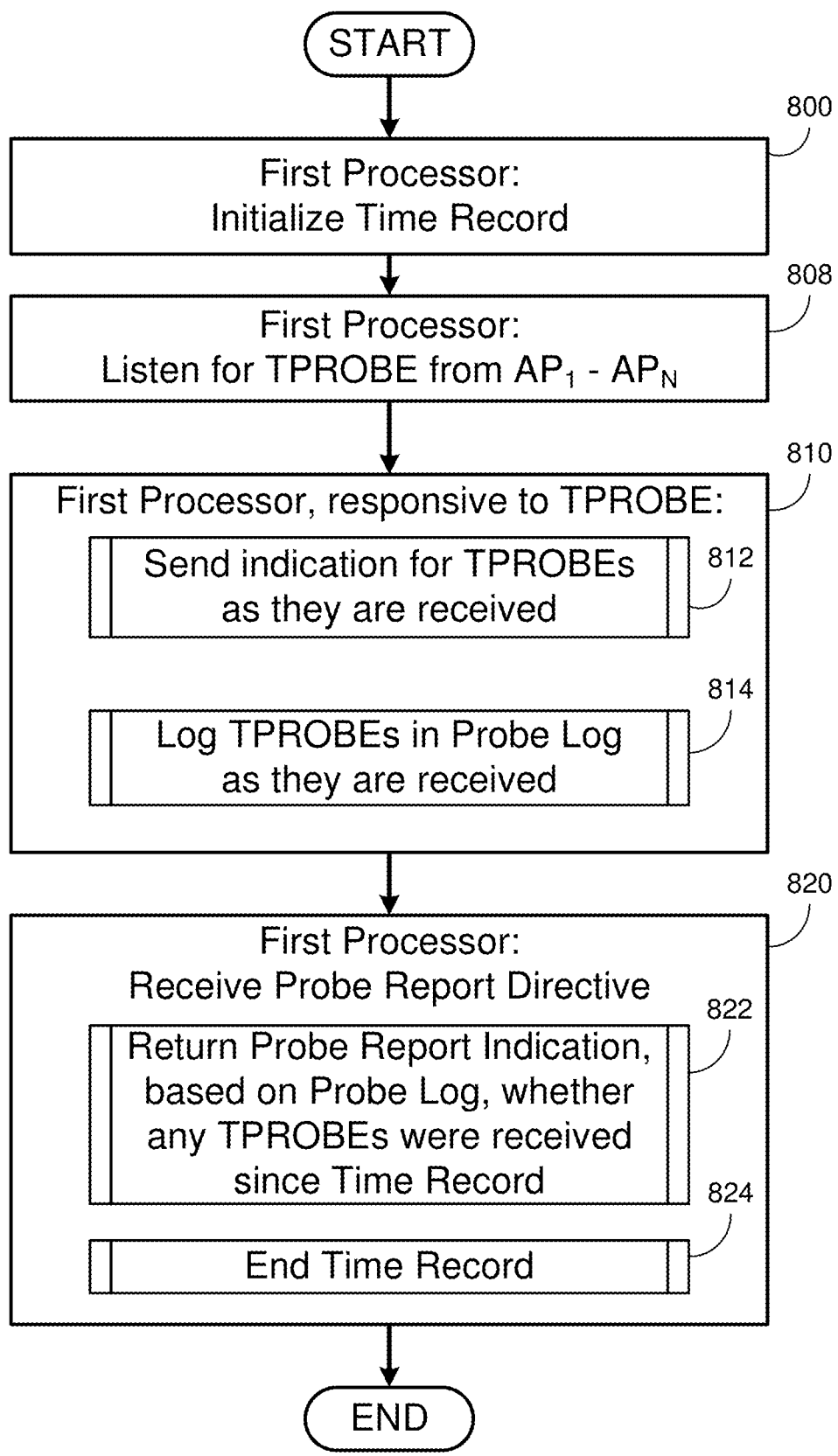
FIG. 8 is a flowchart diagram for a TSPROBE program, in accordance with at least one embodiment of the invention.

Referring now to FIG. 8, FIG. 8 is a flowchart diagram depicting the operational steps of a TSPROBE program, in accordance with at least one embodiment of the invention. At step 800, the first processor 302 initializes the time record 320. At step 808, the first processor 302 listens for one or more probe requests 305, such as TPROBES, that originate from the one or more additional processors 310. The TSPROBE program 318 may be understood as implemented by an embodiment of the XI Probe cross-interrogate. Specifically, TSPROBE may be understood as listening for TPROBEs, which are implemented in hardware as XI Probe cross-interrogates.

At step 810, the first processor 302 responds to each probe request 305 of the one or more probe requests 305, such as TPROBEs) that it receives. At step 812, the first processor 302 sends the indication 307, as in TPROBE, or it otherwise replies appropriately to another probe request 305. At step 814, the first processor 302 logs each TPROBE or other probe request 305 of the zero or more TRPOBEs or other probe requests 305, as they are received, to yield the probe log 322. In the depicted embodiment of TSPROBE, the first processor 302 continues listening for probe requests 305 until, at step 820, the first processor 302 receives (e.g., from software) a probe report directive. The probe report directive may be the execution of the TSPROBE instruction, another instruction, or other indication from the software layer to return data based on the probe log 322. Responsive to the probe report directive, the first processor may generate the probe report indication 324. At step 822, the probe report indication 324 includes whether, since the time record 320, the first processor 302 has received any probe request 305, such as a TPROBE, as indicated in the probe log 322. In various embodiments, the probe report indication 324 may include at least one communication mechanism selected from the group consisting of a status code, a condition code, and a flag setting. At step 824, the first processor 302 may end the time record 320; a new time record 320 may be initialized immediately or at a later time such that subsequent executions of TSPROBE may refer to the newly initialized time record. The time record 320 may be understood as the moment in time at which the relevant interval for embodiments of the TSPROBE program begins. Ending the time record at step 824 may be understood as actively closing the relevant interval for embodiments of the TSPROBE program. Ending the time record 320 need not be equivalent to resetting or re-initializing the time record 320.

With regard to embodiments of the TSPROBE program 318 generally, it should be noted that the contemplated probe request 305 is a TPROBE from another processor, and in the claims a TPROBE and a generic probe request 305 are referred to as "probes". Specifically, each of the one or more probes received by the first processor 302 in TSPROBE may include the execution of a TPROBE (in the claims "t_probe") by one of the one or more additional processors 310.

Figure 9:
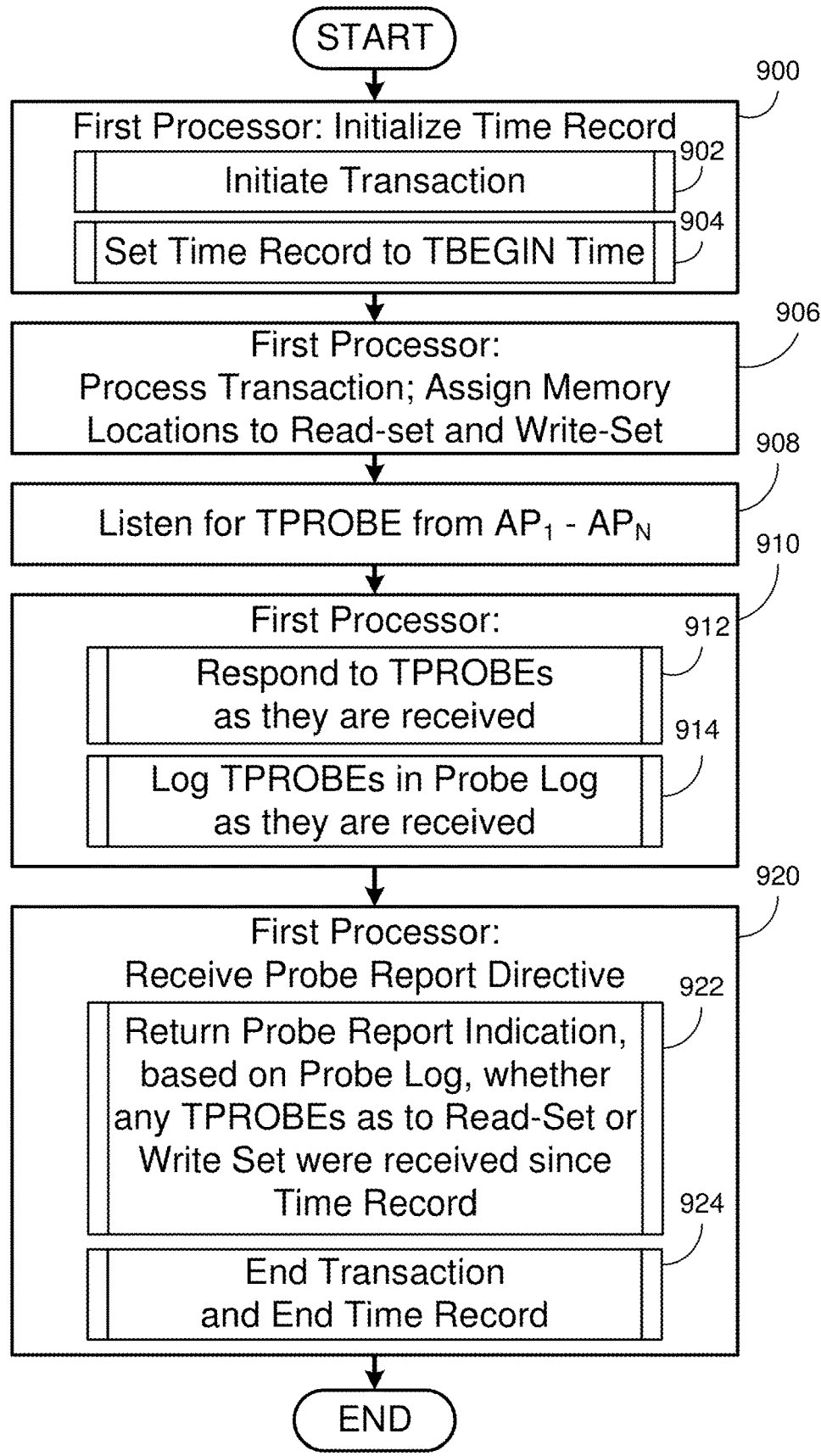
FIG. 9 is a flowchart diagram for a TSPROBE program in the context of a transaction, in accordance with at least one embodiment of the invention.

Referring now to FIG. 9, FIG. 9 is a flowchart diagram depicting the operational steps of a TSPROBE program 318 as used in the context of a transaction on the first processor 302, in accordance with at least one embodiment of the invention. At step 900, the first processor 302 initializes the time record 320 by initiating a transaction with TBEGIN (step 902) and recording when the transaction is initiated by setting the time record 320 to the time of TBEGIN for the transaction. At step 906, the first processor proceeds with the transaction, assigning memory locations to the read-set and write-set associated therewith. At least one of the read-set or the write-set includes one or more memory locations. At step 908 (analogous to step 808), the first processor listens for TPROBEs or other probe requests 305 from the additional processors 310.

At step 910 (similar to step 810), the first processor 302 acts responsively to each TPROBE received. At step 912 (similar to step 812), the first processor 302 replies appropriately to each TPROBE or other probe request 305. At step 914 (similar to step 814), the first processor 302 logs the probe requests 305 in the probe log 322 as they are received. The first processor 302 continues listening for probe requests 305 until, at step 920 (similar to step 820), the first processor 302 receives a probe report directive such as a TSPROBE instruction.

Referring still to the flowchart for an embodiment of the TSPROBE program 318 of FIG. 9, at step 922, the probe report indication denotes whether, since the time record 320, the first processor 302 has received any TPROBE or other probe request 305 that was directed to any memory location in the read-set, write-set, or both the read-set and the write-set for the transaction on the first processor 302. Where, as depicted, TSPROBE is executed in the context of a transaction on the first processor 302, the period since the time record 320 may include the period since initiating the transaction on the first processor 302. At step 924, the first processor 302 ends the time record 320, which may include terminating the current transaction with a TEND instruction.

In some embodiments of TSPROBE, the probe report indication 324 may include a status code. The status code may be represented by two bits. FIG. 16B displays a table of exemplary two-bit status codes for use in a TPROBE program. The two bits may be in any one state selected from the group consisting of state 00, state 01, state 10, and state 11. As shown in the table of FIG. 16B, state 00 may denote that none or the zero or more TPROBEs or other probe requests 305 received by the first processor 302 since the time record 320 were directed to any memory location in the read-set or the write-set for the current transaction. State 01 may denote that at least one of the zero or more TPROBEs or other probe requests 305 received by the first processor 302 since the time record 320 was directed to at least one memory location of the read-set for the current transaction. State 10 may denote that at least one of the zero or more TPROBEs or other probe requests 305 received by the first processor 302 since the time record 320 was directed to at least one memory location of the write-set for the current transaction. State 11 may denote that at least one of the zero or more TPROBEs or other probe requests 305 received by the first processor 302 since the time record 320 was directed to at least one memory location of the write-set for the current transaction.

At step 924, the TSPROBE program returns the probe report indication 324, which may be made available to the software layer. In particular, FIG. 14B presents a segment of C-like pseudocode that demonstrates how an embodiment TSPROBE may be executed from the software layer. It should be noted that TSPROBE may be embodied as a machine instruction not normally directly accessible to high-level code such as the C-like pseudocode of FIG. 14B, however, for purposes of the presented pseudocode, the TSPROBE instructions as well as other instructions from the transactional instruction set architecture (TBEGIN, TEND, and TABORT) may be understood as wrapped in corresponding functions or otherwise made available at the software level.

The pseudocode of FIG. 14B may be understood as part of a thread to be executed on the first processor 302. At line 01, a transaction with TBEGIN. From line 02, the program iterates over a list, searching for a defined Element (line 04), the current element represented by the variable p (initialized at line 01). The program keeps a variable, count (lines 02, 09), of the number of iterations, and each iteration, it applies a test to p→data to determine whether p is equal to the Element of interest (line 04). If p is the correct Element, then some processing occurs, and the program ends the transaction with TEND and branches out of loop (lines 05-06).

Referring still to the pseudocode of FIG. 14B, if count grows to exceed a given value, in this case ten (line 10), then TSPROBE is executed. The inference represented by line 10 is that, if the Element is not found quickly, then the transaction is likely to take a long time, and the program should attempt to ascertain whether the list iterated over by the variable p is wanted for another, perhaps faster, transaction. If other probes are detected (line 11), for example by a nonzero return value from TSBROBE, then the transaction is ended with TABORT (line 12), and the program handles the abort condition as appropriate (line 13). If no probes are detected, then the transaction can proceed through the next iteration. If the Element is neither found (p=NULL, line 03) nor any probe detected, then the transaction exits normally with TEND (line 17).

Figure 10:
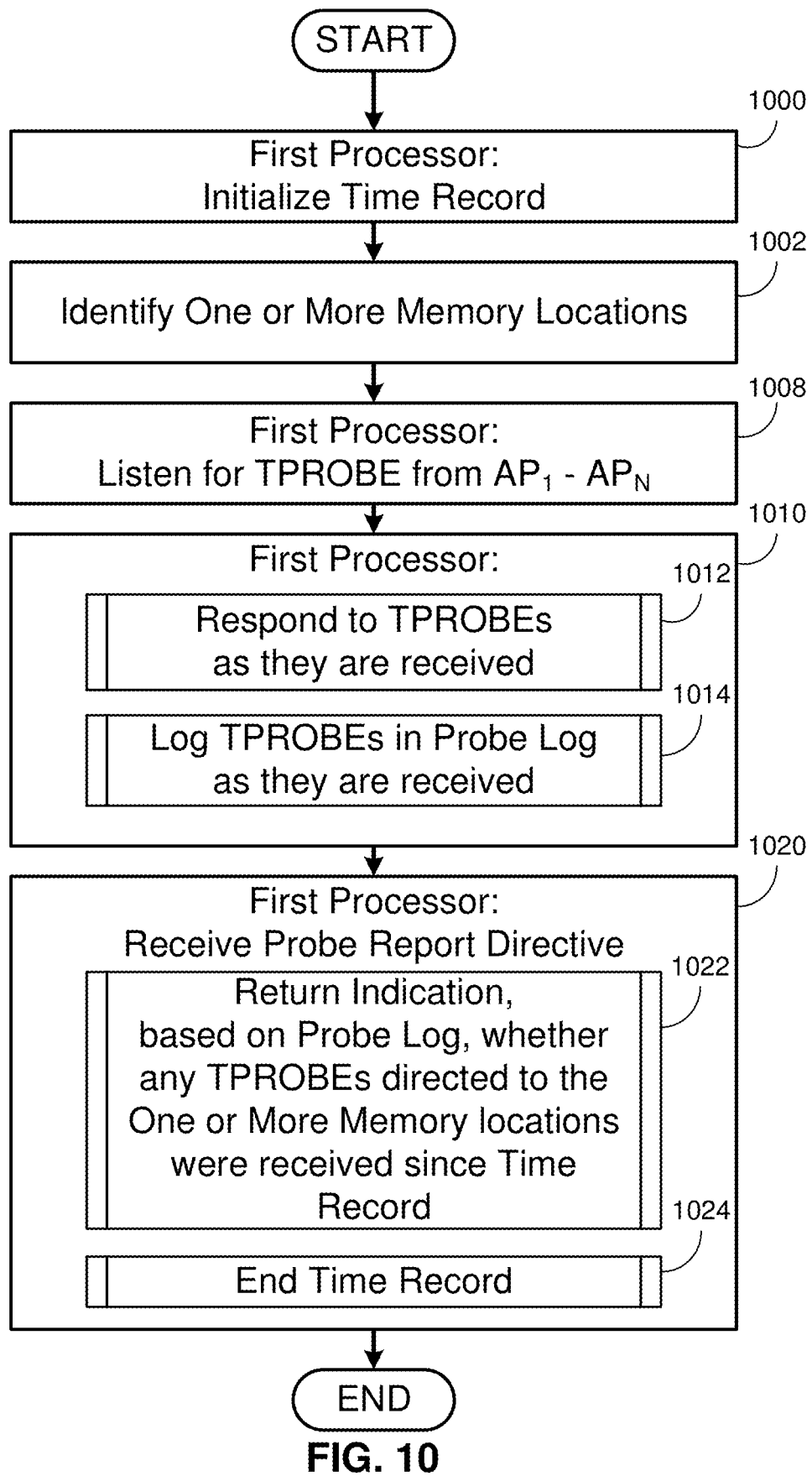
FIG. 10 is a flowchart diagram for a TSPROBE program with respect to a specified memory location, in accordance with at least one embodiment of the invention.

Referring now to FIG. 10, FIG. 10 displays a flowchart diagram for a TSPROBE program configured for execution outside of a transaction and as to a specific memory location 304, in accordance with at least one embodiment of the invention. For the embodiment depicted in FIG. 10, the intended usage of TSPROBE is, broadly, to test whether any probe has been issued as to one or more specified memory locations before accessing them, whether in the context of a transaction or not. The corresponding inference is that, if a probe has been issued as to the one or more memory locations, then the one or more memory locations are likely to soon or already be in use for a transaction on one of the additional processors 310.

Referring still to the embodiment depicted in FIG. 10, at step 1000, the first processor initializes the time record 320. At step 1002, the TSPROBE program 318 identifies one or more memory locations. At step 1008 (analogous to step 808), the first processor listens for TPROBEs or other probe requests 305 from the additional processors 310. At step 1010 (similar to step 810), the first processor 302 acts responsively to each TPROBE received. At step 1012 (similar to step 812), the first processor 302 replies appropriately to each TPROBE or other probe request 305. At step 1014 (similar to step 814), the first processor 302 logs the probe requests 305 in the probe log 322 as they are received. The first processor 302 continues listening for probe requests 305 until, at step 1020 (similar to step 820), the first processor 302 receives a probe report directive such as a TSPROBE instruction.

At step 1022, the TSPROBE program generates the probe report indication 324. The probe report indication 324 denotes whether, since the time record 320, the first processor has received any of the zero or more TPROBEs or other probe requests 305 directed to the one or more memory locations. At step 1024 (analogous to step 824), the first processor 302 ends the time record 320.

Referring now to the XI Probe program, the XI Probe program may implement TPROBE and TSPROBE, in accordance with some embodiments of the present invention. As an XI, XI Probe may be executed within a machine instruction as a micro-op, millicode instruction, or other sub-instruction operation. General embodiments of XI Probe may communicate between processors via the L4 cache 411A-411C, and, in general, additional processors 410, when receiving an XI Probe, may respond without aborting any current transaction or otherwise detecting a read on the current transaction read-set or write-set, regardless of what memory locations are referenced by the XI Probe.

FIG. 15 displays a table of behaviors for an embodiment of XI Probe in comparison to two other XIs: read-only invalidate and exclusive invalidate. As shown, read-only invalidate and exclusive invalidate will cause a transactional abort whenever conflict exists, as per the above-described behavior regarding transactional aborts in the event of a conflict trigger action. Specifically, in contemplated environments, read-only invalidate will cause a transactional abort if it hits on a processor's write-set or both the read-set and the write-set, and an exclusive invalidate will cause a transactional abort if it hits on a processors read-set, write-set, or both. By contrast, the embodiment of XI Probe depicted in FIG. 15 will return information on whether it has hit on the processor's read-set, write-set, or both, but in no case will it cause a transactional abort.

Figure 11:
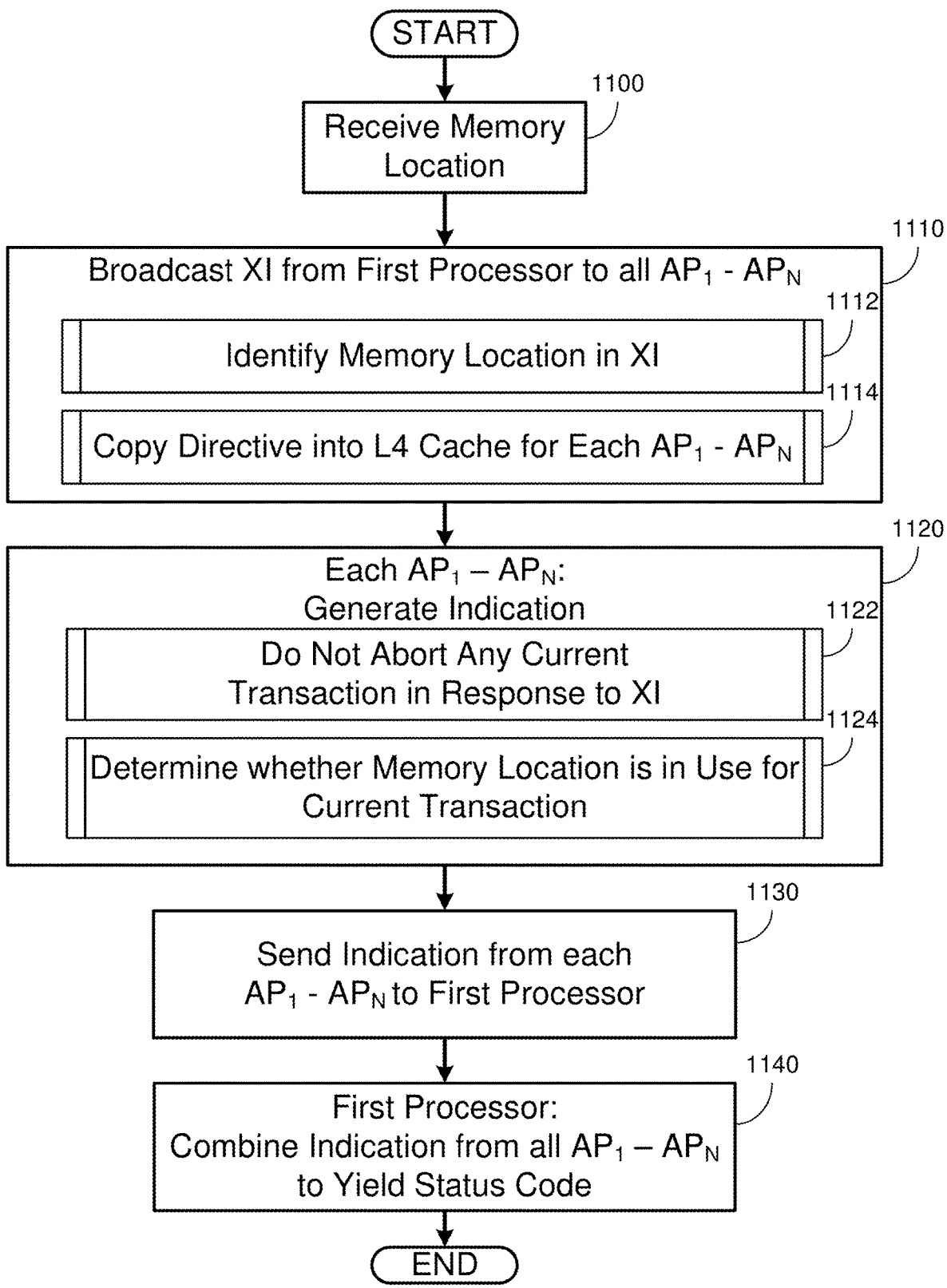
FIG. 11 is a flowchart diagram for an XI Probe program configured for implementing a TPROBE program, in accordance with at least one embodiment of the invention.

FIG. 11 displays a flowchart diagram for an embodiment of XI Probe that implements TPROBE. At step 1100, the XI Probe program receives one or more memory locations 404, for example as an argument to a machine level execution of TPROBE. At step 1110, the XI Probe program broadcasts, by the first processor 402 to the one or more additional processors 410, a cross-interrogate 405. At step 1112, the cross-interrogate 405 references the one or more memory locations 404 via an argument 406. At step 1114, the broadcasting is achieved by copying a directive into to the L4 cache 411A-411C of each additional processor 410.

Referring still to the embodiment of XI Probe depicted in FIG. 11, the XI Probe program receives, by the one or more additional processors 410, the cross-interrogate 405. At step 1120, the XI Probe program generates, by each of the additional processors 410, the indication 407. At step 1122, and as per FIG. 15, the XI Probe program includes not aborting, by the one or more additional processors 410, any current transaction based on the cross-interrogate 405. At step 1124, each additional processor 410 determines whether the memory location 404 is in use for a current transaction such that each indication 407 includes whether the memory location 404 is in use for the current transaction by that of the one or more additional processors 410.

Each indication 407 may be represented by two bits. The two bits may be in any one state selected from the group consisting of state 00, state 01, state 10, and state 11. FIG. 16C displays a table of exemplary two-bit codes that may represent the indication 407 for a single additional processor 410 in an embodiment of XI Probe. In the exemplary code scheme of FIG. 16C, a current transaction on the particular additional processor 410 has associated therewith a read-set and write-set, and at least one of the read-set and the write-set includes one or more memory locations. As shown in the table of FIG. 16C, state 00 may denote that the memory location 404 is not in use by that of the one or more processors 410 for the current transaction. State 01 may denote that the memory location 404 is in use by that of the one or more additional processors 410 for the read-set of the current transaction. State 10 may denote that the memory location 404 is in use by that of the one or more additional processors for the write-set of the current transaction. State 11 may denote that the memory location 404 is in use by that of the one or more additional processors for both the read-set and the write-set of the current transaction.

Referring still to the embodiment of XI Probe depicted in FIG. 11, the XI Probe program, at step 1130, sends the indication 407 from each of the one or more additional processors 410 to the first processor. At step 1140, the XI Probe program may combine, by the first processor 402, each indication 407 from the one or more additional processors 410 to yield a status code. The XI Probe program may return the status code to the calling machine instruction or otherwise make the status code available. In one embodiment, the status code may be determined by applying a boolean-or operation to the two bits of the indication 407 for each of the one or more additional processors 410. Thus, the combined status code may capture any transaction in the computer system 400 that uses the memory location 404.

Figure 12:
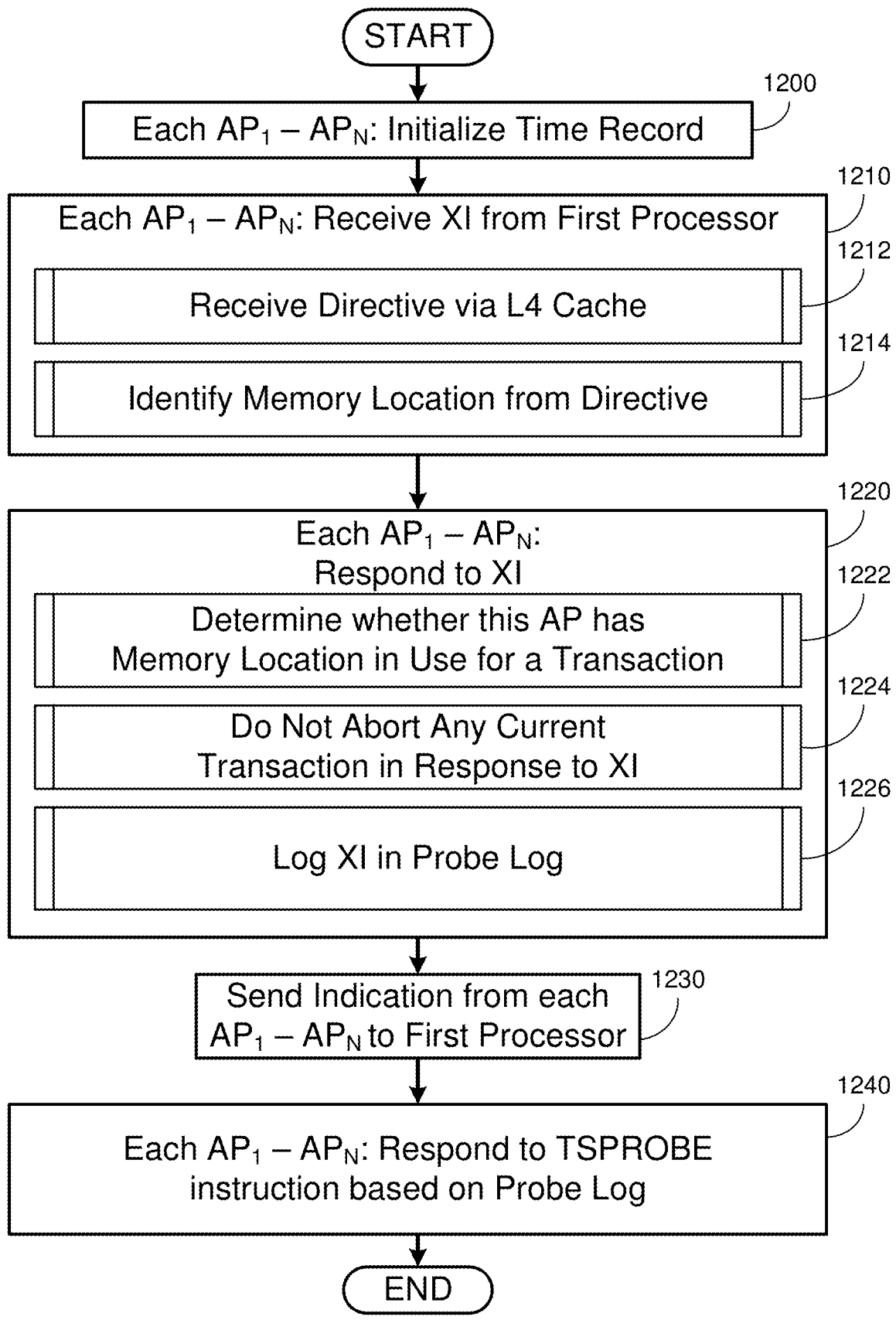
FIG. 12 is a flowchart diagram for an XI Probe program configured for implementing a TSPROBE program, in accordance with at least one embodiment of the invention.

The XI Probe program may also implement TSPROBE, as depicted in the flowchart diagram of FIG. 12. The depiction may be extended to embodiments of TSPROBE that identify one or more memory locations, including both arbitrary memory locations and memory locations associated with the read-set or write-set of a transaction, as well as embodiments that do not identify any memory location. In the embodiment of FIG. 12, each additional processor 410 initializes a time record at step 1200. As discussed above, the time record may mark the start of a current transaction, the time of last executing TSPROBE, or an arbitrary time. Each additional processor 410 receives a cross-interrogate at step 1210 by receiving a directive via L4 cache at step 1212. Each additional processor 410 identifies the memory location passed by the XI from the directive in L4 cache at step 1214.

Referring still to the flowchart for an embodiment of XI Probe of FIG. 12, at step 1220, each additional processor 410 responds to the XI. At step 1222, each of the one or more additional processors 410 generate the indication 407, which includes whether the particular additional processor 410 has the XI-identified memory location in use for a transaction. At step 1224, the additional processor 410 does not cause an abort of any current transaction in response to the XI 405. At step 1226, each additional processor 410 records the cross-interrogate 405 in its probe log. At step 1230, the indication 407 may be sent from each additional processor 410 to the first processor 402, completing each additional processor 410's response to the XI. At step 1240, each additional processor waits for and responds to a probe report directive (e.g. a TSPROBE instruction). Responding to the probe report directive may include returning, by that of the one or more additional processors, a probe report indication. The probe report indication includes whether, since the time record, that of the one or more additional processors has received at least one instance of the cross-interrogate.

Figure 13:
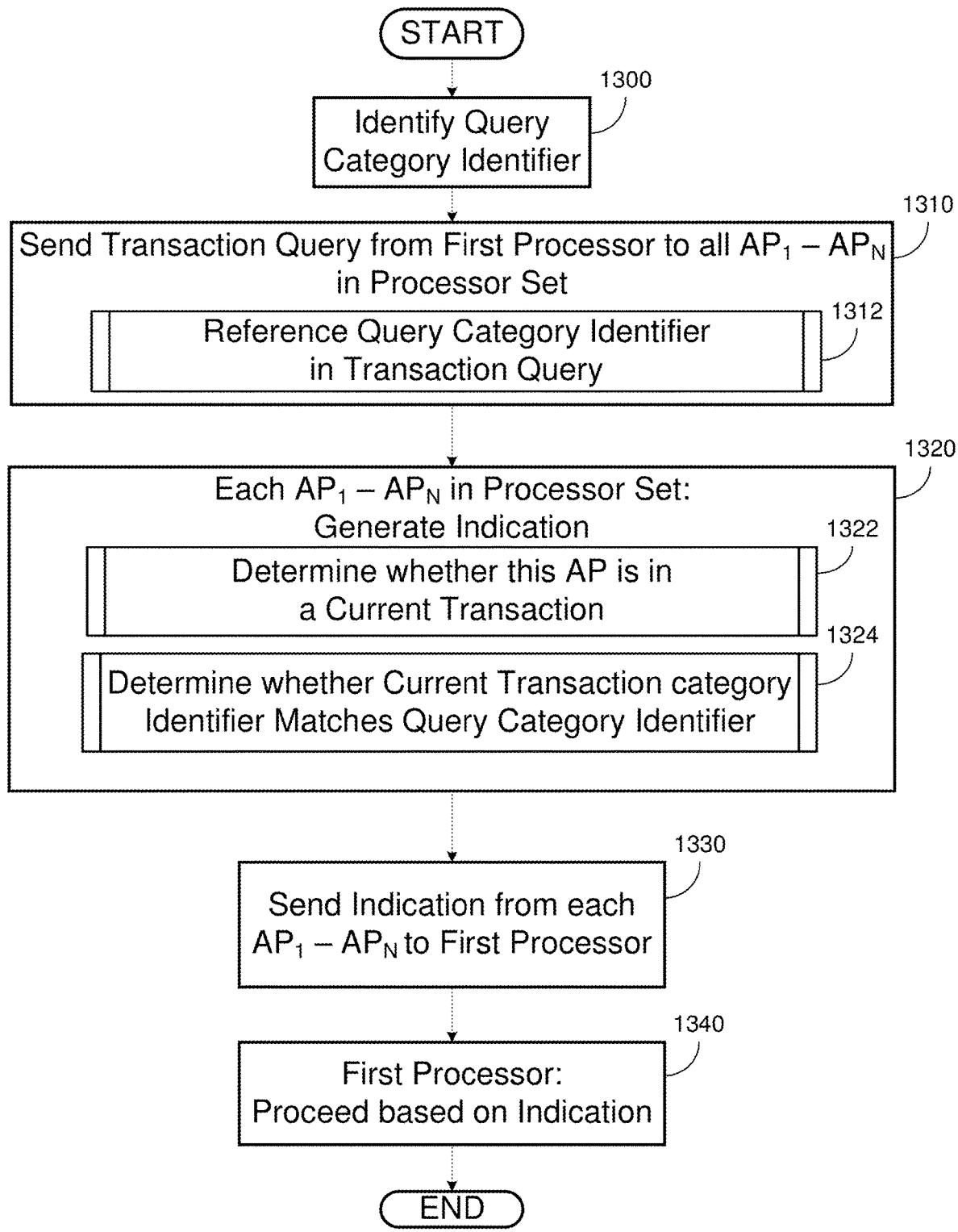
FIG. 13 is a flowchart diagram for a TQUERY program, in accordance with at least one embodiment of the invention.

Referring now to FIG. 13, FIG. 13 displays a flowchart diagram for a TQUERY program, in accordance with at least one embodiment of the invention. The TQUERY program may operate in a hardware TM environment including a plurality of processors. The transactional memory environment may support one or more transactions by the first processor 602 and the processor set. The plurality of processors may be understood as including the first processor 602 and a processor set. The processor set includes one or more additional processors 604A-604E. As above, the processor set may include all processor in the computer system 600, all processors on the same LPAR (LPAR$_1$ 606A) as the first processor 602, or a differently defined subset.

In embodiments wherein the transactional memory environment supports a transaction category scheme, at step 1300, the TQUERY program may identify a query category identifier 609, which may be received from the software layer as an argument to the TQUERY machine instruction. At step 1310, the TQUERY program may send the transaction query 608 from the first processor 602 to the processor set. For embodiments with transaction category support, the transaction query 608 may include the query category identifier 609; this may be achieved by reference at step 1312.

Referring still to the embodiment depicted in FIG. 13, the TQUERY program generates, by each additional processor 604A-604E in the processor set, the indication 607. The indication 607 includes whether the additional processor 604A-604E is executing a transaction. The TQUERY program determines this at step 1322. For embodiments that support a transaction category scheme, at step 1324, each additional processor 604A-604E determines whether the category identifier of the current transaction matches the query category identifier 609. Thus, the indication 607, may include whether the category identifier of the current transaction matches the query category identifier 609.

Referring still to the embodiment depicted in FIG. 13, the TQUERY program, at step 1320, sends the indication 607 from each additional processor 604A-604E in the processor set to the first processor 602. The indications 607 may be combined at the first processor into a status code denoting whether any transaction anywhere on the computer system 600 was detected by the TQUERY, which may be made available to the software layer. More generally, at step 1330, the first processor 602 may proceed based on the indication 607.

FIG. 14C displays a segment of assembly language-like pseudocode showing an exemplary usage of an embodiment of a TQUERY machine instruction. In the pseudocode of FIG. 14C, the depicted program calls TQUERY an argument of 7, denoting that the TQUERY is directed to transactions of category 7. As above, the assignment of category 7 to transactions on a particular data structure or other class of transactions may be managed in the software layer, or by dedicated circuits. Following the TQUERY execution, the depicted program of FIG. 14C executes a BRNZ (break if not zero) directed to the result of TQUERY, denoting that if TQUERY detected any transaction of category 7—and giving a nonzero return value—then, the program is to break and go to the label QUERY_AGAIN. This creates a simple loop whereby the depicted program repeatedly TQUERIES until there are no transactions of the identified category, at which point it initiates a transaction with category 7 by TBEGINC, which may be understood as a category-enabled version of TBEGIN. The depicted program then executes an exemplary transaction (in this case, swapping two memory locations C and D, though it should be noted that the TQUERY program is of relatively greater value the longer and more complicated the transaction) and concludes with TEND.

Figure 17:
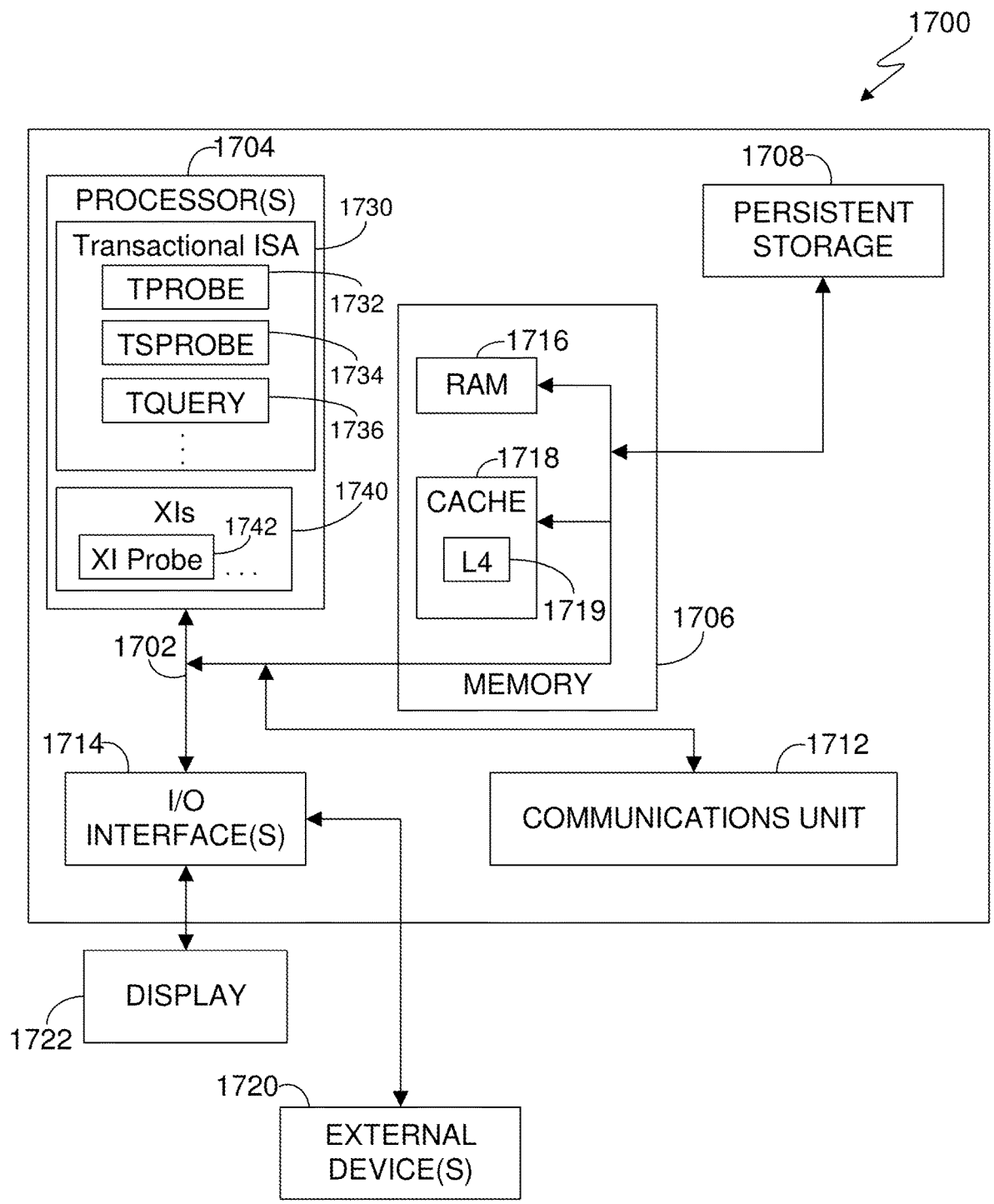
FIG. 17 is a block diagram of an exemplary computing apparatus suitable for performing the disclosed TPROBE, TSPROBE, TQUERY, and XI Probe programs, in accordance with at least one embodiment of the present invention.

FIG. 17 is a block diagram depicting components of a computer 1700 suitable for executing the disclosed methods. FIG. 17 displays the computer 1700, the one or more processor(s) 1704 (including one or more computer processors), the communications fabric 1702, the memory 1706, the RAM 1716, the cache 1718, the persistent storage 1708, the communications unit 1712, the I/O interfaces 1714, the display 1722, and the external devices 1720. It should be appreciated that FIG. 17 provides only an illustration of one embodiment and does not imply any limitations with regard to the environments in which different embodiments may be implemented. Many modifications to the depicted environment may be made.

Depicted within the processor 1704 is the transactional instruction set architecture ("ISA") 1730. The transactional ISA 1730 may be understood as including all of the machine instructions provided for the operation of the computer system 1700 with its transactional memory environment, including LOAD and STORE instructions, arithmetic instructions, TBEGIN, and TEND. Included within the Transactional ISA 1730 may be one or more of the methods of the present invention to be executed as a machine instruction, including a TPROBE machine instruction 1732, a TSPROBE machine instruction 1734, and a TQUERY machine instruction 1736.

Also depicted within the processor 1704 are the cross-interrogates (XIs) 1740, including XI Probe 1742, which, as defined above, may be sub-instruction operations of the processor 1704, embodied, for example, as millicode procedures, micro-ops, or directly in circuitry, that enable communications between cache levels or between processors. In some embodiments, as above, interprocessor XIs communicate via one or more L4 caches 1719 of the various processors 1704, or between different L4 caches of the same processor 1704. In particular, the XI Probe XI 1742 may be executed as a micro-op or otherwise. The XI Probe XI 1742 may be further configured to implement various machine instructions, including the TPROBE machine instruction 1732, the TSPROBE machine instruction 1734, and the TQUERY instruction 1736.

As depicted, the computer 1700 operates over a communications fabric 1702, which provides communications between the computer processor(s) 1704, memory 1706, persistent storage 1708, communications unit 1712, and input/output (I/O) interface(s) 1714. The communications fabric 1702 may be implemented with any architecture suitable for passing data or control information between the processors 1704 (e.g. microprocessors, communications processors, and network processors), the memory 1706, the external devices 1720, and any other hardware components within a system. For example, the communications fabric 1702 may be implemented with one or more buses.

The memory 1706 and persistent storage 1708 are computer readable storage media. In the depicted embodiment, the memory 1706 comprises a random access memory (RAM) 1716 and a cache 1718. In general, the memory 1706 may comprise any suitable volatile or non-volatile one or more computer readable storage media.

Program instructions for the disclosed programs may be stored in the persistent storage 1708, or more generally, any computer readable storage media, for execution by one or more of the respective computer processors 1704 via one or more memories of the memory 1706. The persistent storage 1708 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 1708 may also be removable. For example, a removable hard drive may be used for persistent storage 1708. Other examples include optical and magnetic disks, thumb drives, and smart cards that are inserted into a drive for transfer onto another computer readable storage medium that is also part of the persistent storage 1708.

The communications unit 1712, in these examples, provides for communications with other data processing systems or devices. In these examples, the communications unit 1712 may comprise one or more network interface cards. The communications unit 1712 may provide communications through the use of either or both physical and wireless communications links. In the context of some embodiments of the present invention, the source of the various input data may be physically remote to the computer 1700 such that the input data may be received and the output similarly transmitted via the communications unit 1712.

The I/O interface(s) 1714 allow for input and output of data with other devices that may operate in conjunction with the computer 1700. For example, the I/O interface 1714 may provide a connection to the external devices 1720, which may be as a keyboard, keypad, a touch screen, or other suitable input devices. External devices 1720 may also include portable computer readable storage media, for example thumb drives, portable optical or magnetic disks, and memory cards. Software and data used to practice embodiments of the present invention may be stored on such portable computer readable storage media and may be loaded onto the persistent storage 1708 via the I/O interface(s) 1714. The I/O interface(s) 1714 may similarly connect to a display 1722. The display 1722 provides a mechanism to display data to a user and may be, for example, a computer monitor.

A computer system suitable for executing the TPROBE program 301, TSPROBE program 318, XI Probe program 401, TQUERY program 501 or category TQUERY program 601, according to at least one embodiment of this invention comprises a processing circuit (comprising one or more processors, including one or more computer processors), one or more computer readable storage media, and communications mechanisms between those and other parts of the computer. The possible forms of computer readable storage media comprise persistent storage components (such as hard disks), main memory components, cache components, registers and other storage media components in the processing circuit, online storage components, and offline bulk storage components.

The computer-implemented method, computer program product, and computer system that embody the present invention as described herein may be implemented in machine hardware using logic circuits, processing circuits, millicode, firmware, and other machine level computing elements. Those skilled in the art of designing computing machines and machine elements will be able to generate machine components designs and machine components that implement the program instructions disclosed herein.

In some embodiments, transactional memory environment in which the invention is implemented is characterized by a behavior that a transactional abort is triggered by a conflict trigger action as to a conflict transaction. The conflict transaction may be any transaction on any of the several processors of the system, and may include a conflict read-set and a conflict write-set. Various conflict trigger actions may be configured to cause an abort, including at least where the conflict trigger action is selected from the group consisting of: (a) when one or more processors load from the conflict write-set of the conflict transaction; or store to the conflict read-set or conflict write-set of the conflict trigger transaction.

Various embodiments of the invention may be implemented in a data processing system suitable for storing and/or executing program code that includes at least one processor (including at least one computer processor) coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more aspects of the present invention can be included in an article of manufacture (e.g., a computer program product or combination of two or more computer program products) having, for instance, computer usable media or computer readable storage media. The media has therein, for instance, computer readable program code means or logic (e.g., instructions, code, commands, etc.) to provide and facilitate the capabilities of the present invention. The computer readable storage media store instructions, including program instructions or computer program instructions. The article of manufacture can be included as a part of a system (e.g., computer system) or sold separately.

One example of an article of manufacture or a computer program product incorporating one or more aspects of the present invention includes, for instance, one or more computer usable media to store computer readable program code means or logic thereon to provide and facilitate one or more aspects of the present invention. The computer readable storage medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Although one or more examples have been provided herein, these are only examples. Many variations are possible without departing from the spirit of the present invention. For instance, processing environments other than the examples provided herein may include and/or benefit from one or more aspects of the present invention. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A computer-implemented method comprising, in a transactional memory environment including a plurality of processors comprising a first processor and an additional processor:
    identifying a first memory location and a second memory location, wherein the first memory location and the second memory location are for a transaction by the additional processor, wherein the transaction has associated therewith a read-set and a write-set, and wherein each of the read-set and the write-set comprises one or more memory locations;
    sending a probe request comprising a cross-interrogate from the first processor to the additional processor, the probe request including the first memory location;
    generating an indication comprising a read bit and a write bit, by the additional processor, wherein the indication denotes a status for the first memory location, wherein the indication comprises a value of 1, and wherein the indication is selected from a group consisting of: the read bit and the write bit is in a state 01 denoting that the first memory location is in use for the read-set, the read bit and the write bit is in a state 10 denoting that the first memory location is in use for the write-set, and the read bit and the write bit is in a state 11 denoting that the first memory location is in use for both the read-set and the write-set;
    sending the indication from the additional processor to the first processor; and
    proceeding, by the first processor, to send another probe request including the second memory location in response to the indication comprising a value of 1.

2. The computer-implemented method of claim 1, wherein the additional processor does not detect any access to the first memory location.

3. The computer-implemented method of claim 1, wherein the additional processor does not interpret the probe request as a transaction abort condition.

4. The computer-implemented method of claim 1, wherein the indication comprises a status code.

5. The computer-implemented method of claim 1, wherein the indication comprises a condition code.

6. The computer-implemented method of claim 1, wherein the indication comprises a flag setting.

7. The computer-implemented method of claim 1, wherein the first memory location is stored in one or more cache lines.

8. The computer-implemented method of claim 1, the computer-implemented method being executed as a machine instruction to the first processor.

9. The computer-implemented method of claim 1, wherein the transactional memory environment is characterized by a behavior that a transactional abort is triggered by a conflict trigger action as to a conflict transaction including a conflict read-set and a conflict write-set, the conflict trigger action causing a processor to store the conflict read-set and the conflict write-set.

10. A computer program product, the computer program product comprising one or more non-transitory computer readable storage media and program instructions stored on the one or more non-transitory computer readable storage media, the program instructions comprising instructions to, in a transactional memory environment including a plurality of processors comprising a first processor and an additional processor:
    identify a first memory location and a second memory location, wherein the first memory location and the second memory location are for a transaction by the additional processor, wherein the transaction has associated therewith a read-set and a write-set, and wherein each of the read-set and the write-set comprises one or more memory locations;
    send a probe request comprising a cross-interrogate from the first processor to the additional processor, the probe request including the first memory location;
    generate an indication comprising a read bit and a write bit, by the additional processor, wherein the indication denotes a status for the first memory location, wherein the indication comprises a value of 1, and wherein the indication is selected from a group consisting of: the read bit and the write bit is in a state 01 denoting that the first memory location is in use for the read-set, the read bit and the write bit is in a state 10 denoting that the first memory location is in use for the write-set, and the read bit and the write bit is in a state 11 denoting that the first memory location is in use for both the read-set and the write-set;

send the indication from the additional processor to the first processor; and proceed, by the first processor, to send another probe request including the second memory location in response to the indication comprising a value of 1.

11. The computer program product of claim 10, wherein the additional processor does not detect any access to the first memory location.

12. The computer program product of claim 10, wherein the additional processor does not interpret the probe request as a transaction abort condition.

13. The computer program product of claim 10, wherein the indication comprises at least one communication mechanism selected from a group consisting of:
   (a) a status code;
   (b) a condition code; and
   (c) a flag setting.

14. The computer program product of claim 10, wherein the first memory location is stored in one or more cache lines.

15. A computer system comprising:
   one or more processing circuits; and
   one or more computer readable storage media;
   wherein the computer readable storage media store instructions for execution by the one or more processing circuits;
   the instructions comprising instructions to, in a transactional memory environment including a plurality of processors comprising a first processor and an additional processor:
      identify a first memory location and a second memory location, wherein the first memory location and the second memory location are for a transaction by the additional processor, wherein the transaction has associated therewith a read-set and a write-set, and wherein each of the read-set and the write-set comprises one or more memory locations;
      send a probe request comprising a cross-interrogate from the first processor to the additional processor, the probe request including the first memory location;
      generate an indication comprising a read bit and a write bit, by the additional processor, wherein the indication denotes a status for the first memory location, wherein the indication comprises a value of 1, and wherein the indication is selected from a group consisting of: the read bit and the write bit is in a state 01 denoting that the first memory location is in use for the read-set, the read bit and the write bit is in a state 10 denoting that the first memory location is in use for the write-set, and the read bit and the write bit is in a state 11 denoting that the first memory location is in use for both the read-set and the write-set;
      send the indication from the additional processor to the first processor; and
      proceed, by the first processor, to send another probe request including the second memory location in response to the indication comprising a value of 1.

16. The computer system of claim 15, wherein the additional processor does not detect any access to the first memory location.

17. The computer system of claim 15, wherein the additional processor does not interpret the probe request as a transaction abort condition.

18. The computer system of claim 15, wherein the indication comprises at least one communication mechanism selected from a group consisting of:
   (a) a status code;
   (b) a condition code; and
   (c) a flag setting.

19. The computer system of claim 15, wherein the first memory location is stored in one or more cache lines.

* * * * *